US011080059B1

(12) United States Patent
Agarwal et al.

(10) Patent No.: US 11,080,059 B1
(45) Date of Patent: Aug. 3, 2021

(54) REDUCING FIRMWARE SIZE AND INCREASING FIRMWARE PERFORMANCE

(71) Applicant: SanDisk Technologies LLC, Addison, TX (US)

(72) Inventors: Sonam Agarwal, Jaipur Rajasthan (IN); Vijay Sukhlal Chinchole, Bangalore (IN); Pavithra Devaraj, Bangalore (IN)

(73) Assignee: SanDisk Technologies LLC, Addison, TX (US)

( * ) Notice: Subject to any disclaimer, the term of this patent is extended or adjusted under 35 U.S.C. 154(b) by 0 days.

(21) Appl. No.: 16/834,437

(22) Filed: Mar. 30, 2020

(51) Int. Cl.
   *G06F 9/30* (2018.01)
   *G06F 8/65* (2018.01)

(52) U.S. Cl.
   CPC ............ *G06F 9/30189* (2013.01); *G06F 8/65* (2013.01); *G06F 9/30101* (2013.01)

(58) Field of Classification Search
   USPC ...................................................... 717/174
   See application file for complete search history.

(56) References Cited

U.S. PATENT DOCUMENTS

| 5,163,139 | A | 11/1992 | Haigh et al. | |
|---|---|---|---|---|
| 6,629,235 | B1 * | 9/2003 | Flachs | G06F 9/30094 |
| | | | | 712/219 |
| 7,509,639 | B2 * | 3/2009 | Worley, Jr. | G06F 9/468 |
| | | | | 713/164 |
| 7,987,458 | B2 | 7/2011 | Rothman et al. | |
| 8,555,039 | B2 | 10/2013 | Rychlik | |
| 8,904,151 | B2 | 12/2014 | Gschwind et al. | |
| 2004/0044884 | A1 * | 3/2004 | Devereux | G06F 9/30094 |
| | | | | 712/226 |
| 2004/0243978 | A1 * | 12/2004 | Walmsley | G06F 21/64 |
| | | | | 717/120 |
| 2018/0047458 | A1 * | 2/2018 | Bucksch | G11C 29/38 |
| 2019/0347125 | A1 * | 11/2019 | Sankaran | G06F 9/48 |

OTHER PUBLICATIONS

Bojnordi and Ipek; "Programmable DDRx Controllers"; IEEE Micro, vol. 33, No. 3 (pp. 106-115); May-Jun. 2013 (Year: 2013).*

(Continued)

*Primary Examiner* — Qing Chen
*Assistant Examiner* — Clint Thatcher
(74) *Attorney, Agent, or Firm* — Vierra Magen Marcus LLP

(57) ABSTRACT

A method for reducing firmware size and increasing firmware performance. Core timing control conditions used by a die controller are converted into production ready core timing control conditions, from which firmware instructions are then generated. The production ready core timing control conditions comprise a plurality of fixed core timing control conditions. The firmware instructions are modified to determine core timing control condition values for fixed core timing control conditions before implementing storage operations, to store the core timing control condition values in global condition registers, and to modify references to fixed core timing control conditions to access the values in those global condition registers. Finally, the modified firmware instructions are stored on the die controller, which comprises a microcontroller configured to execute them.

20 Claims, 13 Drawing Sheets

(56) References Cited

OTHER PUBLICATIONS

Schwarz et al.; "Access: HW/SW Co-Equivalence Checking for Firmware Optimization"; 2019 56th ACM/IEEE Design Automation Conference (DAC) (pp. 1-6); 2019 (Year: 2019).*
Edler Von Koch, Tobias J.K.et. al., Exploiting Function Similarity for Code Size Reduction, LCTES '14, Jun. 12-13, 2014, pp. 85-94.
Huang, Chih-Tsun et. al., A Programmable BIST Core for Embedded DRAM, IEEE Design & Test of Computers, Jan.-Mar. 1999, pp. 59-70.

\* cited by examiner

REDUCING FIRMWARE SIZE AND INCREASING FIRMWARE PERFORMANCE

BACKGROUND

Conventional storage devices may implement finite state machines using combinational logic components designed onto a memory die. However, some problems in the designed logic may not be identified until the first silicon wafers are fabricated. Corrective actions for those problems may not be implemented and tested until a next wafer fabrication, any new issues may then wait for a further round of fabrication to be corrected, and so on.

Rather than implementing such state machines in hardware, potentially leading to multiple manufacturing cycles before all issues are resolved, there is a need for a solution that may be easily tested and improved outside of the manufacturing process. Finite state machines may, for example, be converted in whole, or in part, into software or firmware, instead of, or in addition to, being built out of combinational logic.

However, a typical storage device may implement combinational logic to generate analog and/or digital signals that relate to over five hundred unique conditions. A firmware solution encompassing the same conditions may require an unacceptable amount memory to store the firmware instructions. In addition, a firmware solution encompassing these same conditions may require an unacceptable amount time to execute comparable functionality to that of a combinational logic solution/design. There is a need for an easily updated solution that takes up as little space as possible in on-chip memory and performs within performance parameters similar to, or better than a combinational logic design.

BRIEF SUMMARY

This disclosure relates to a method for reducing firmware size and increasing firmware performance. Core timing control conditions used by a die controller are first converted into production ready core timing control conditions, from which firmware instructions are then generated. The production ready core timing control conditions comprise a plurality of fixed core timing control conditions. The firmware instructions are then modified to determine core timing control condition values for fixed core timing control conditions before implementing storage operations, to store the core timing control condition values in global condition registers, and to modify references to fixed core timing control conditions to access the values in those global condition registers. Finally, the modified firmware instructions are stored on the die controller, which comprises a microcontroller configured to execute them.

This disclosure further relates to a method for reducing firmware size and increasing firmware performance. Core timing control conditions used by a die controller are first converted into production ready core timing control conditions, from which firmware instructions are then generated. The production ready core timing control conditions comprise a plurality of fixed core timing control conditions. Two or more short firmware instructions from the generated firmware instructions are then replaced with a long firmware instruction. In another aspect, core timing control conditions and/or other data that could be implemented using a set of two or more short firmware instructions may instead be implemented using a single long firmware instruction. A core timing control machine is configured to automatically move a subroutine result to a condition value buffer when the core timing control machine begins executing a subsequent subroutine.

Firmware instructions referencing common core timing control conditions within a common subroutine are modified to reuse a value for the common core timing control condition, which is stored in a common subroutine result register. A first firmware instruction of a first subroutine for a storage operation is modified to store a repeated core timing control condition in a local condition register, and a second firmware instruction of a second subroutine for the storage operation is modified to reference the value for the repeated core timing control condition stored in the local condition register.

The firmware instructions are then modified to determine core timing control condition values for fixed core timing control conditions before implementing storage operations, to store the core timing control condition values in global condition registers, and to modify references to fixed core timing control conditions to access the values in those global condition registers. The firmware instructions are further modified such that each subroutine references the common subroutine result register and the core timing control machine automatically changes an output register associated with the common subroutine result register in response to the core timing control machine transitioning from executing the first subroutine to executing the second subroutine. Firmware instructions in the second subroutine that are repetitive are replaced with a call instruction to corresponding firmware instructions in the first subroutine. Finally, a core timing control machine is configured to change a control signal value to a set_reset value in response to a corresponding core timing control condition evaluating to true and to retain the control signal value in response to the corresponding core timing control condition evaluating to false.

This disclosure relates to an apparatus comprising a non-volatile memory array, an instruction buffer, a first core timing control machine, a second core timing control machine, and a clock. The non-volatile memory array comprises a plurality of control signals that perform storage operations based on their settings. The instruction buffer stores a set of firmware instructions such that pairs of firmware instructions in the set each share a common address within the instruction buffer. The first and second core timing control machines each execute one or more pairs of firmware instructions in parallel to determine control signal values for the control signals and sets the determined control signal values in a control signal setting buffer. The clock operates the core timing control machines concurrently to each alternately execute time segments of a storage operation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
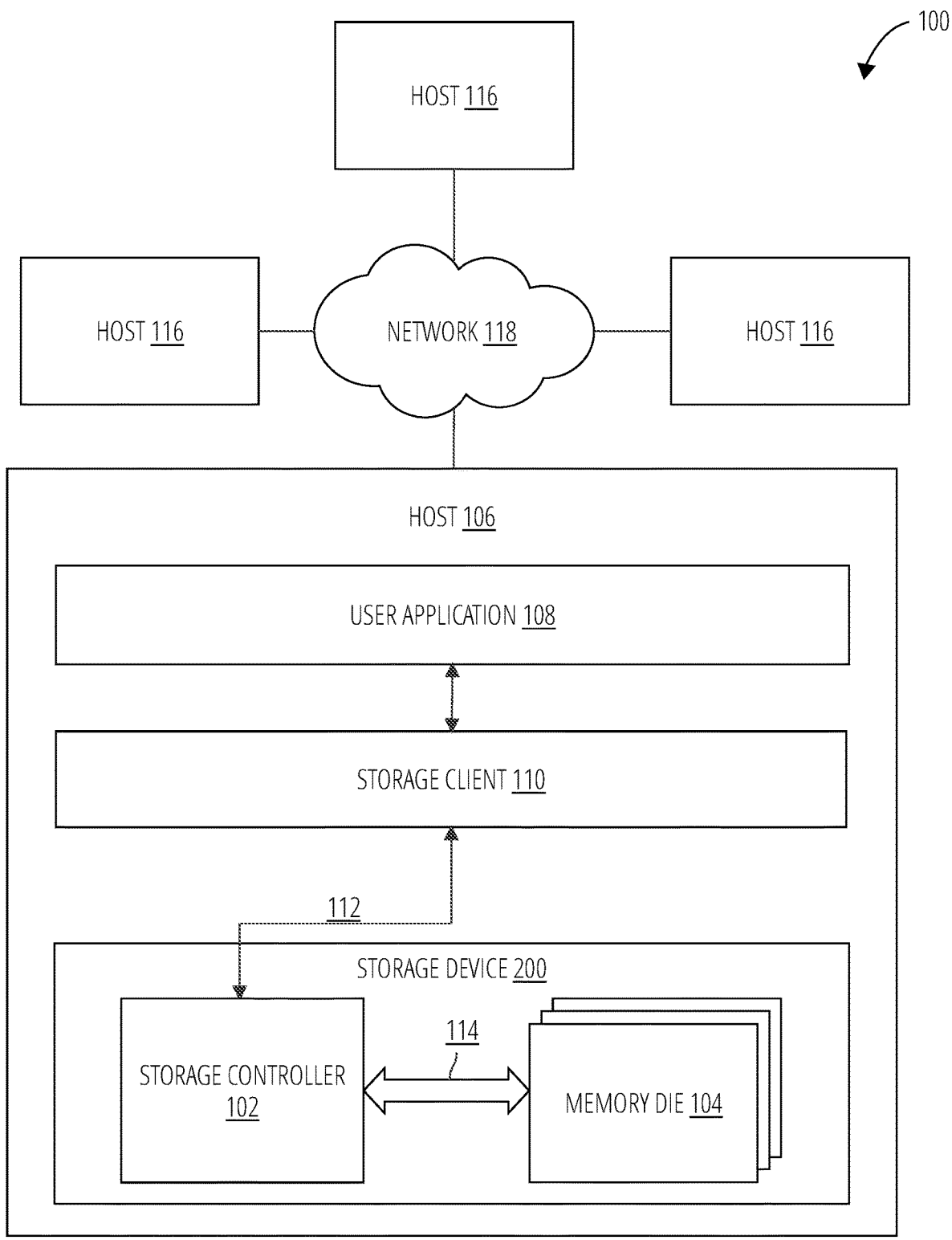
FIG. 1 illustrates a storage system 100 in accordance with one embodiment.

To address inefficiencies in debugging hardware after manufacturing logic, such as combinational logic implemented in a semiconductor (e.g., Integrated Circuit, IC), a finite state machine may be implemented using a microcontroller and firmware instructions. In order to replace conventional combinational logic, fall within storage space limits, and meet precise timing sequences, the firmware instructions of this solution and the machines that execute them are modified, in accordance with certain embodiments, as described below.

"Firmware" refers to logic embodied as processor-executable instructions stored on volatile memory media and/or non-volatile memory media.

"Firmware instruction" refers to instructions in a form that is directly executable by a programmable device without further translation by a compiler, interpreter, or assembler. Firmware instruction may be represented and referred to at different levels of abstraction including as high level software instructions, machine code instructions, machine language instructions, or the like. The level of abstraction for a reference to a firmware instruction is understood from the context. In certain aspects, the terms firmware instruction, machine code instruction, machine code, and machine language may each be used interchangeably. In certain aspects, such as in digital devices, a firmware instruction is a sequence of ones and zeros configured such that a processor, decoder, or other logic can execute a single operation as directed in the firmware instruction. In certain aspects, a firmware instruction is represented and described in relation to one or more of a mnemonic, a set of operands, a label, and/or comments. In such a representation, people can more readily track what operations a firmware instruction set is performing. In certain aspects a set of firmware instructions may be designed, organized, or configured to perform a specific set of operations and may thus be referred to with a name representative of that specific operation. For example, firmware instructions that are specific to evaluating, calculating, or determining condition values, including but not limited to, core timing control conditions, may be referred to herein as condition instructions.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Timing sequence" refers to a predefined order in which a certain activity, event, or operation are performed or carried out in relation to a starting time and an ending time. In certain aspects, a timing sequence may be divided into smaller parts referred to herein as time segments. A single timing sequence may be comprised of a set of time segments. In certain aspects, a timing sequence comprises a set of time segment organized into a particular order.

"Time segment" refers to an amount of time of a predefined length. In one aspect, the predefined length is fixed. In another embodiment, the predefined length is variable. In one aspect, a timing sequence may be divided into an integer number of time segments, such as 1, 2, 3, 4, 5, 6, 7, 8, 9, 10, or the like.

FIG. 1 is a schematic block diagram illustrating one embodiment of a storage system 100 that includes a storage device in accordance with the disclosed solution. The storage system 100 comprises a storage device 200, a storage controller 102, a memory die 104, a host 106, a user application 108, a storage client 110, a data bus 112, a bus 114, at least one host 116, and a network 118.

The storage system 100 includes at least one storage device 200, comprising a storage controller 102 and one or more memory die 104, connected by a bus 114. In some embodiments, the storage system 100 may include two or more memory devices.

"Controller" refers to any hardware, device, component, element, circuitry, or circuit configured to manage and control another software, hardware, firmware, device, apparatus, or logic unit, component, device, or component.

"Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

Each storage device 200 may include two or more memory die 104, such as FLASH memory, nano random access memory ("nano RAM or NRAM"), magneto-resistive RAM ("MRAM"), dynamic RAM ("DRAM"), phase change RAM ("PRAM"), etc. In further embodiments, the data storage device 200 may include other types of non-volatile and/or volatile data storage, such as dynamic RAM ("DRAM"), static RAM ("SRAM"), magnetic data storage, optical data storage, and/or other data storage technologies.

"Memory" refers to any hardware, circuit, component, module, logic, device, or apparatus configured, programmed, designed, arranged, or engineered to retain data. Certain types of memory require availability of a constant power source to store and retain the data. Other types of memory retain and/or store the data when a power source is unavailable.

"Memory die" refers to a small block of semiconducting material on which a given functional circuit is fabricated. Typically, integrated circuits are produced in large batches on a single wafer of electronic-grade silicon (EGS) or other semiconductor (such as GaAs) through processes such as photolithography. The wafer is cut (diced) into many pieces, each containing one copy of the circuit. Each of these pieces is called a die. (Search die (integrated circuit) on Wikipedia.com Oct. 9, 2019. Accessed Nov. 18, 2019.) A memory die is a die, In one embodiment, that includes a functional circuit for operating as a non-volatile memory media and/or a non-volatile memory array.

A memory die is a die that includes a functional circuit for operating as a non-volatile memory media and/or a non-volatile memory array. "Non-volatile memory array" refers to a set of non-volatile storage cells (also referred to as memory cells or non-volatile memory cells) organized into an array structure having rows and columns. A memory array is addressable using a row identifier and a column identifier.

"FLASH memory" refers to a type of non-volatile memory comprising memory cells comprising two types NOR and NAND each type named after the type of logic gates used in the memory array of memory cells.

The storage device 200 may be a component within a host 106 as depicted in here, and may be connected using a data bus 112, such as a peripheral component interconnect express ("PCI-e") bus, a Serial Advanced Technology Attachment ("serial ATA") bus, or the like. In another embodiment, the storage device 200 is external to the host 106 and is connected, a universal serial bus ("USB") connection, an Institute of Electrical and Electronics Engineers ("IEEE") 1394 bus ("FireWire"), or the like. In other embodiments, the storage device 200 is connected to the host 106 using a peripheral component interconnect ("PCI") express bus using external electrical or optical bus extension or bus networking solution such as InfiniBand or PCI Express Advanced Switching ("PCIe-AS"), or the like.

In various embodiments, the storage device 200 may be in the form of a dual-inline memory module ("DIMM"), a daughter card, or a micro-module. In another embodiment, the storage device 200 is a component within a rack-mounted blade. In another embodiment, the storage device 200 is contained within a package that is integrated directly onto a higher-level assembly (e.g., mother board, laptop, graphics processor). In another embodiment, individual components comprising the storage device 200 are integrated directly onto a higher-level assembly without intermediate packaging. The storage device 200 is described in further detail with regard to FIG. 2.

In a further embodiment, instead of being connected directly to the host 106 as DAS, the data storage device 200 may be connected to the host 106 over a data network. For example, the data storage device 200 may include a storage area network ("SAN") storage device, a network attached storage ("NAS") device, a network share, or the like. In one embodiment, the storage system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host 106 and the data storage device 200.

The storage system 100 includes at least one host 106 connected to the storage device 200. "Host" refers to any computing device or computer device or computer system configured to send and receive storage commands. "Storage command" refers to any command relating with a storage operation. "Storage operation" refers to an operation performed on a memory cell in order to change, or obtain, the value of data represented by a state characteristic of the memory cell. Examples of storage operations include but are not limited to reading data from (or sensing a state of) a memory cell, writing (or programming) data to a memory cell, and/or erasing data stored in a memory cell.

Examples of a host include, but are not limited to, a computer, a laptop, a mobile device, an appliance, a virtual machine, an enterprise server, a desktop, a tablet, a main frame, and the like. Multiple hosts 106 may be used and may comprise a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a host 106 may be a client and the storage device 200 operates autonomously to service data requests sent from the host 106. In this embodiment, the host 106 and storage device 200 may be connected using a computer network, system bus, Direct Attached Storage (DAS) or other communication means suitable for connection between a computer and an autonomous storage device 200.

The depicted embodiment shows a user application 108 in communication with a storage client 110 as part of the host 106. In one embodiment, the user application 108 is a software application operating on or in conjunction with the storage client 110. "Storage client" refers to any hardware, software, firmware, or logic component or module configured to communicate with a storage device in order to use storage services. Examples of a storage client include, but are not limited to, operating systems, file systems, database applications, a database management system ("DBMS"), server applications, a server, a volume manager, kernel-level processes, user-level processes, applications, mobile applications, threads, processes, and the like.

"Hardware" refers to functional elements embodied as analog and/or digital circuitry.

"Firmware" refers to logic embodied as processor-executable instructions stored on volatile memory media and/or non-volatile memory media.

"Software" refers to logic implemented as processor-executable instructions in a machine memory (e.g., read/write volatile memory media or non-volatile memory media).

The storage client 110 manages files and data and utilizes the functions and features of the storage controller 102 and associated memory die 104. Representative examples of storage clients include, but are not limited to, a server, a file system, an operating system, a database management system ("DBMS"), a volume manager, and the like. The storage client 110 is in communication with the storage controller 102 within the storage device 200. In some embodiments, the storage client 110 may include remote storage clients operating on hosts 116 or otherwise accessible via the network 118. Storage clients may include, but are not limited to operating systems, file systems, database applications, server applications, kernel-level processes, user-level processes, applications, and the like.

In one embodiment, the storage system 100 includes one or more clients connected to one or more hosts 116 through one or more computer networks 118. A host 116 may be a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The network 118 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The network 118 may also include a network from the IEEE 802 family of network technologies, such Ethernet, token ring, WiFi, WiMax, and the like.

The network 118 may include servers, switches, routers, cabling, radios, and other equipment used to facilitate networking the host 106 or hosts and host 116 or clients. In one embodiment, the storage system 100 includes multiple hosts that communicate as peers over a network 118. In another embodiment, the storage system 100 includes multiple storage devices 200 that communicate as peers over a network 118. One of skill in the art will recognize other computer networks comprising one or more computer networks and related equipment with single or redundant connection between one or more clients or other computer with one or more storage devices 200 or one or more storage devices 200 connected to one or more hosts. In one embodiment, the storage system 100 includes two or more storage devices 200 connected through the network 118 to a host 116 without a host 106.

In one embodiment, the storage client 110 communicates with the storage controller 102 through a host interface comprising an Input/Output (I/O) interface. For example, the storage device 200 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. Traditionally, a sector is 512 bytes of data. One or more sectors are organized into a block (referred to herein as both block and data block, interchangeably). "Storage media" refers to any physical media organized and configured to store one or more bits of data. In one embodiment, storage media refers to physical storage cells and/or memory cells used in volatile memory media. In another embodiment, storage media refers to physical storage cells and/or memory cells used in non-volatile memory media.

"Data block" refers to a smallest physical amount of storage space on physical storage media that is accessible, and/or addressable, using a storage command. The physical storage media may be volatile memory media, non-volatile memory media, persistent storage, non-volatile storage, flash storage media, hard disk drive, or the like. Certain conventional storage devices divide the physical storage media into volumes or logical partitions (also referred to as partitions). Each volume or logical partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or similar operating systems, the data blocks are referred to simply as blocks. A data block or cluster represents a smallest physical amount of storage space on the storage media that is managed by a storage controller. A block storage device may associate n data blocks available for user data storage across the physical storage media with a logical block address (LBA), numbered from 0 to n. In certain block storage devices, the logical block addresses may range from 0 to n per volume or logical partition. In conventional block storage devices, a logical block address maps directly to one and only one data block.

"Logical block address" refers to a value used in a block storage device to associate each of n logical blocks available for user data storage across the storage media with an address. In certain block storage devices, the logical block addresses (LBAs) may range from 0 to n per volume or partition. In block storage devices, each LBA maps directly to a particular data block, and each data block maps to a particular set of physical sectors on the physical storage media.

In one example embodiment, a data block includes eight sectors which is 4 KB. In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or data block or cluster represents a smallest physical amount of storage space on the storage media that is managed by a storage manager, such as a storage controller, storage system, storage unit, storage device, or the like.

In some embodiments, the storage controller 102 may be configured to store data on one or more asymmetric, write-once storage media, such as solid-state storage memory cells within the memory die 104. As used herein, a "write once" storage media refers to storage media that is reinitialized (e.g., erased) each time new data is written or programmed thereon. As used herein, an "asymmetric" storage media refers to a storage media having different latencies for different storage operations. "Storage operation" refers to an operation performed on a memory cell in order to change, or obtain, the value of data represented by a state characteristic of the memory cell. Examples of storage operations include but are not limited to reading data from (or sensing a state of) a memory cell, writing (or programming) data to a memory cell, and/or erasing data stored in a memory cell. Many types of solid-state storage media (e.g., memory die) are asymmetric; for example, a read operation may be much faster than a write/program operation, and a write/program operation may be much faster than an erase operation (e.g., reading the storage media may be hundreds of times faster than erasing, and tens of times faster than programming the storage media).

The memory die 104 may be partitioned into memory divisions that can be erased as a group (e.g., erase blocks) in order to, inter alia, account for the asymmetric properties of the memory die 104 or the like. As such, modifying a single data segment in-place may require erasing the entire erase block comprising the data, and rewriting the modified data to the erase block, along with the original, unchanged data. This may result in inefficient write amplification, which may excessively wear the memory die 104.

"Erase block" refers to a logical erase block or a physical erase block. "Physical erase block" refers to smallest storage unit within a given memory die that can be erased at a given time (e.g., due to the wiring of storage cells on the memory die). In one embodiment, a physical erase block represents the smallest storage unit within a given memory die that can be erased at a given time (e.g., due to the wiring of storage cells on the memory die). In one embodiment, logical erase blocks represent the smallest storage unit, or storage block, erasable by a storage controller in response to receiving an erase command. In such an embodiment, when the storage controller receives an erase command specifying a particular logical erase block, the storage controller may erase each physical erase block within the logical erase block simultaneously. It is noted that physical erase blocks within a given logical erase block may be considered as contiguous within a physical address space even though they reside in separate dies. Thus, the term "contiguous" may be applicable not only to data stored within the same physical medium, but also to data stored within separate media.

"Write amplification" refers to a measure of write/programming operations performed on a non-volatile storage device which result in writing any data, and user data in particular, more times than initially writing the data in a first instance. in certain embodiments, write amplification may count the number of write operations performed by a non-volatile storage device in order to manage and maintain the data stored on the non-volatile storage device. in other embodiments, write amplification measures the amount of data, the number of bits, written that are written beyond an initial storing of data on the non-volatile storage device.

Therefore, in some embodiments, the storage controller 102 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

Management of a data block by a storage manager includes specifically addressing a particular data block for a read operation, write operation, or maintenance operation. A block storage device may associate n blocks available for user data storage across the storage media with a logical address, numbered from 0 to n. In certain block storage devices, the logical addresses may range from 0 to n per volume or partition.

"Logical address" refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A logical address does not indicate the physical location of data on the storage media but is an abstract reference to the data.

"Logical address space" refers to a logical representation of memory resources. The logical address space may comprise a plurality (e.g., range) of logical addresses.

In conventional block storage devices, a logical address maps directly to a particular data block on physical storage media. In conventional block storage devices, each data block maps to a particular set of physical sectors on the physical storage media. However, certain storage devices do not directly or necessarily associate logical addresses with particular physical data blocks. These storage devices may emulate a conventional block storage interface to maintain compatibility with a block storage client 110.

In one embodiment, the storage controller 102 provides a block I/O emulation layer, which serves as a block device interface, or API. In this embodiment, the storage client 110 communicates with the storage device through this block device interface. In one embodiment, the block I/O emulation layer receives commands and logical addresses from the storage client 110 in accordance with this block device interface. As a result, the block I/O emulation layer provides the storage device compatibility with a block storage client 110.

In one embodiment, a storage client 110 communicates with the storage controller 102 through a host interface comprising a direct interface. In this embodiment, the storage device directly exchanges information specific to non-volatile storage devices. "Non-volatile storage device" refers to any hardware, device, component, element, or circuit configured to maintain an alterable physical characteristic used to represent a binary value of zero or one after a primary power source is removed. Examples of a non-volatile storage device include, but are not limited to, a hard disk drive (HDD), Solid-State Drive (SSD), non-volatile memory media, and the like. A storage device using direct interface may store data in the memory die 104 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die 104.

The storage controller 102 receives a logical address and a command from the storage client 110 and performs the corresponding operation in relation to the memory die 104. The storage controller 102 may support block I/O emulation, a direct interface, or both.

Figure 2:
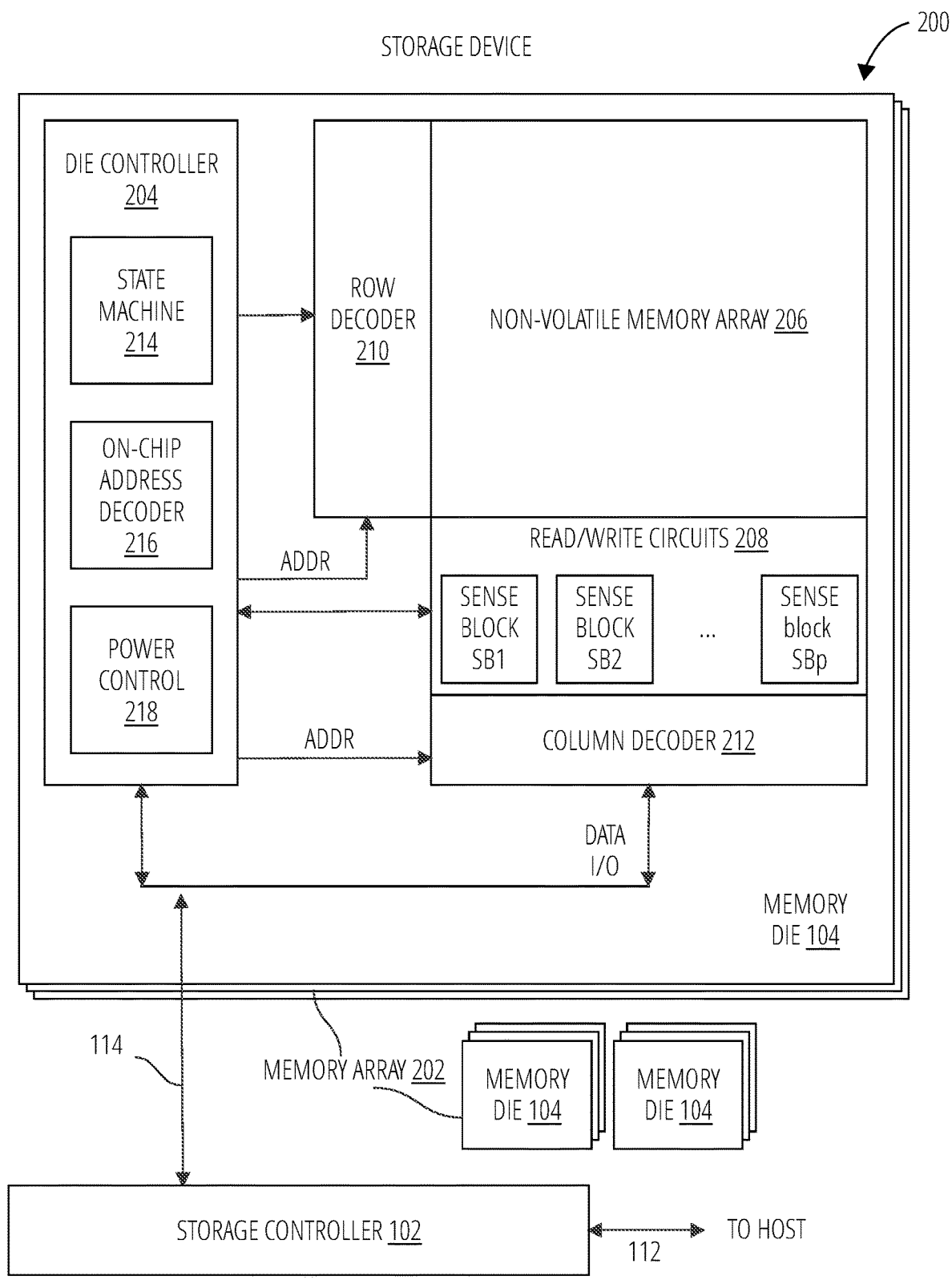
FIG. 2 illustrates a storage device 200 in accordance with one embodiment.

FIG. 2 is a block diagram of an exemplary storage device 200. The storage device 200 may include a storage controller 102 and a memory array 202. Each memory die 104 in the memory array 202 may include a die controller 204 and at least one non-volatile memory array 206 in the form of a three-dimensional array and read/write circuits 208.

Consequently, a non-volatile memory array is a memory array having memory cells configured such that a characteristic (e.g., threshold voltage level, resistance level, conductivity, etc.) of the memory cell used to represent stored data remains a property of the memory cell without a requirement for using a power source to maintain the characteristic. "Characteristic" refers to any property, trait, quality, or attribute of an object or thing. Examples of characteristics include, but are not limited to, condition, readiness for use, unreadiness for use, chemical composition, water content, temperature, relative humidity, particulate count, a data value, contaminant count, and the like.

"Threshold" refers to a level, point, or value above which a condition is true or will take place and below which the condition is not true or will not take place. (search "threshold" on Merriam-Webster.com. Merriam-Webster, 2019. Web. 14 Nov. 2019. Edited)

"Threshold voltage" refers to a voltage level that when applied to a gate terminal of a transistor causes the transistor to conduct a current between the drain terminal and source terminal.

For example, in FLASH memory cells in which each memory cell comprises a transistor having a source terminal, a drain terminal, and a gate terminal, the determinable characteristic is a voltage level that when applied to the gate terminal causes the memory cell to conduct a current between the drain and the source terminals. A threshold voltage may also be referred to as a control gate reference voltage (CGRV), read voltage, or reference voltage.

A memory array is addressable using a row identifier and a column identifier. Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

The non-volatile memory array 206 is addressable by word line via a row decoder 210 and by bit line via a column decoder 212.

The read/write circuits 208 include multiple sense blocks SB1, SB2, . . . , SBp (sensing circuitry) and allow a page of memory cells to be read or programmed in parallel. In certain embodiments, each memory cell across a row of the memory array together form a physical page. "Sense circuitry" refers to a circuit, sub-circuit, electronic component, hardware, software, firmware, module, logic, device, or apparatus configured, programmed, designed, arranged, or engineered to determine a memory state for a memory cell coupled to the sense circuit. A sense circuit may be referred to as a sense amplifier or sense amp herein and may or may not include one or more sense amplifiers.

A physical page may include memory cells along a row of the memory array for a single plane or for a single memory die. In one embodiment, the memory die includes a memory array made up of two equal sized planes. "Plane" refers to a division of the memory array that permits certain storage operations to be performed on both planes using certain physical row addresses and certain physical column addresses. In one embodiment, a physical page of one plane of a memory die includes four data blocks (e.g., 16 KB). In one embodiment, a physical page (also called a "die page") of a memory die includes two planes each having four data blocks (e.g., 32 KB).

Commands and data are transferred between the host 106 and storage controller 102 via a data bus 112, and between the storage controller 102 and the one or more memory die 104 via bus 114. The storage controller 102 may comprise the logical modules described in more detail with respect to FIG. 1.

The non-volatile memory array 206 can be two-dimensional (2D—laid out in a single fabrication plane) or three-dimensional (3D—laid out in multiple fabrication planes). The non-volatile memory array 206 may comprise one or more arrays of memory cells including a 3D array. In one embodiment, the non-volatile memory array 206 may comprise a monolithic three-dimensional memory structure (3D array) in which multiple memory levels are formed above (and not in) a single substrate, such as a wafer, with no intervening substrates. The non-volatile memory array 206 may comprise any type of non-volatile memory that is monolithically formed in one or more physical levels of arrays of memory cells having an active area disposed above a silicon substrate. The non-volatile memory array 206 may be in a non-volatile solid-state drive having circuitry associated with the operation of the memory cells, whether the associated circuitry is above or within the substrate.

Word lines may comprise sections of the layers containing memory cells, disposed in layers above the substrate. Multiple word lines may be formed on single layer by means of trenches or other non-conductive isolating features.

The die controller 204 cooperates with the read/write circuits 208 to perform memory operations on memory cells of the non-volatile memory array 206. "Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components. The die controller 204 includes a state machine 214, an address decoder 216, and a power control 218. The state machine 214 provides chip-level control of memory operations. The address decoder 216 provides an address interface between that used by the host or a storage controller 102 to the hardware address used by the row decoder 210 and column decoder 212. The power control 218 controls the power and voltages supplied to the various control lines during memory operations.

The power control 218 and/or read/write circuits 208 can include drivers for word lines, source gate select (SGS) transistors, drain gate select (DGS) transistors, bit lines, substrates (in 2D memory structures), charge pumps, and source lines. In certain embodiments, the power control 218 may detect a sudden loss of power and take precautionary actions. The power control 218 may include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than non-volatile memory array 206, can be thought of as at least one control circuit or storage controller which is configured to perform the techniques described herein. For example, a control circuit may include any one of, or a combination of, die controller 204, state machine 214, address decoder 216, column decoder 212, power control 218, sense blocks SB1, SB2, . . . , SBp, read/write circuits 208, storage controller 102, and so forth.

In one embodiment, the host 106 is a computing device (e.g., laptop, desktop, smartphone, tablet, digital camera) that includes one or more processors, one or more processor readable storage devices (RAM, ROM, FLASH memory, hard disk drive, solid state memory) that store processor readable code (e.g., software) for programming the storage controller 102 to perform the methods described herein. The host may also include additional system memory, one or more input/output interfaces and/or one or more input/output devices in communication with the one or more processors, as well as other components well known in the art.

Associated circuitry is typically required for operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Figure 3:
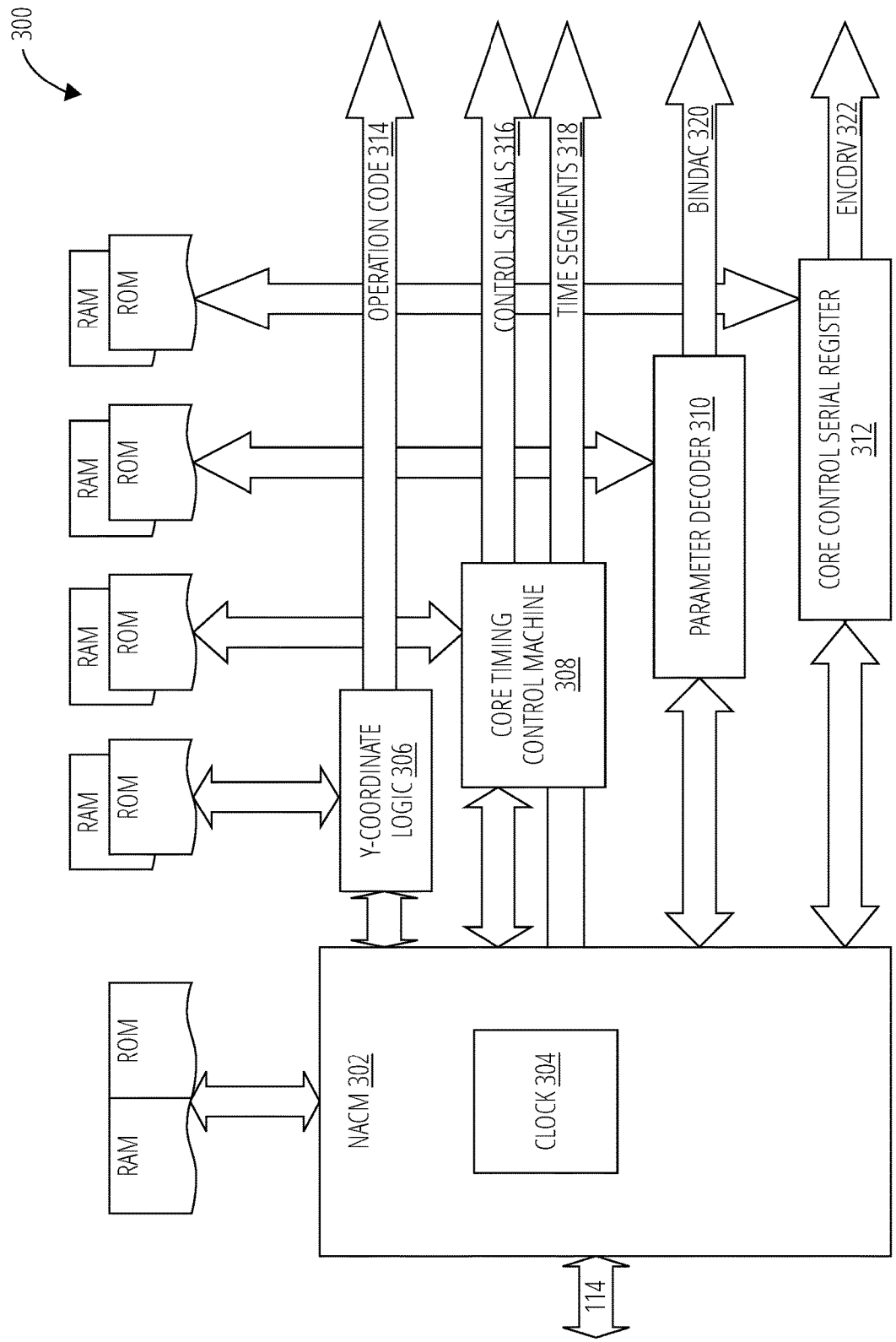
FIG. 3 illustrates a die controller 300 in accordance with one embodiment.

FIG. 3 illustrates a die controller 300 in accordance with one embodiment. "Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components.

The die controller 300 includes one or more logic functions implemented using firmware instructions. Firmware instruction configured to provide a certain set of functionality may be identified by a block in the block diagram of FIG. 3. In one embodiment, the die controller 300 may include a combination of combinational logic and firmware instruction or just firmware instructions.

The die controller 300 may comprise a NAND algorithm and controller machine 302 or NACM 302, a clock 304, and a number of other modules which may be referred to as submodules. These submodules may include Y-coordinate logic 306, a core timing control machine 308, a parameter decoder 310, and a core control serial register 312. The NACM 302 and each submodule may further interface with available random access memory (RAM), such as SRAM, logic circuits for storing data such as a microprocessor register, and/or read only memory (ROM).

The NACM 302 may control modules such as the Y-coordinate logic 306, core timing control machine 308, parameter decoder 310, and core control serial register 312. The NACM 302 may decode commands received over the bus 114 into different storage operations, such as read, program, and erase. Depending on the operation, the NACM 302 may activate one or more submodules that implement states of a finite state machine for different modes. For example, for program operations, the NACM 302 may activate one or more submodules that implement a data programming state, followed by a program verify state. In another embodiment, the die controller 300 may be configured such that a single finite state machine may be divided into a plurality of smaller finite state machines that are each responsible for a particular aspect of managing a non-volatile memory array to implement a storage operation.

The NACM 302 may have a built in clock 304 module. "Clock" refers to any hardware, software, firmware, circuit, electronic component, module, logic, device, or apparatus configured, programmed, designed, arranged, or engineered to supply a clock signal for two or more circuits or electronic components. The clock 304 may configure different clock signals depending on which state of a finite state machine is activated.

"Clock signal" refers to a control signal, used with synchronous digital circuits, configured to oscillate between a high state and a low state at a particular rate or frequency, measured in clock cycles, for a communication interface. Common clock signals operate such that the signal forms a square wave with a 50% duty cycle. Electronic components rely on a clock signal operating at a constant, fixed frequency. Circuits using a clock signal for synchronization may become active at either the rising edge, falling edge, or, in the case of double data rate, both in the rising and in the falling edges of the clock cycle. (Search clock signal on Wikipedia.com Nov. 11, 2019. Modified. Accessed Feb. 20, 2020.)

"Clock cycle" refers to a time between when an oscillator that generates a clock signal changes from a high signal to a low signal or vice versa. "Control signal" refers to an electrical signal (wired or wireless) sent from one device, component, manager, or controller to another device, component, manager, or controller configured to act in response to the control signal.

For example, for a programming state, clock 304 may set a main clock as a pre-charge clock, followed by a programming clock, followed by a recovery clock. Each main clock may be divided into different timing time segments 318, with different control logic implemented in each time segment 318. The NACM 302 may provide the different mode operations to be executed, as well as the different clock signals with which each operation is to be executed, to all of the submodules.

The Y-coordinate logic 306 may refer to the logic designed and placed across the Y-coordinate of the NAND memory die. Consider a non-volatile memory array laid out in a square or rectangle shape of rows and columns. The Y-coordinate logic 306 manages logic positioned closest to the rows of the non-volatile memory array. This Y-coordinate logic 306 may operate on a data input that is one page wide. The Y-coordinate logic 306 may be implemented as a three-stage pipelined machine that produces operation code 314. The operation code 314 may be used to trigger data latch operations.

The core timing control machine 308 may be used to implement the solution disclosed herein. The core timing control machine 308 may perform the operations described herein. In particular, the core timing control machine 308 may manage, coordinate, and/or produce the control signals 316 and time segments 318 implemented in the disclosed solution.

The parameter decoder 310 may generate digital voltages or binary values as output binary values for DAC 320. The voltages/values may be used during different storage operations. The binary values for DAC 320 may be inputs to charge pumps, which act as digital-to-analog converters (DACs), to convert the digital voltages to analog values. The resulting analog values may be used to drive core circuitry including control lines of a non-volatile memory array.

The core control serial register 312 may generate clock and data signals within a data transfer protocol used between the die controller and the non-volatile memory array. These signals may comprise encoded driver voltages 322 that may be applied to core circuitry during read, program, or erase operations. "Register" refers to a temporary storage location used to store an address, or a data value, used in a computing operation by a processor. Certain registers may be named based on a type of data the register normally stores such as an address register that stores addresses or a data register that stores data or an operand register that stores values used in a firmware instruction. A register may be implemented with logic gates, flip-flops, SRAM, or the like.

Each word line and/or bit line of a NAND non-volatile memory array may operate at various voltages, depending on which state the die controller 300 is in (erased, programmed, being read, etc.). These voltages may be controlled by the core control serial register 312. The core control serial register 312 may receive information on which word line is selected, and may provide the appropriate outputs for that word line.

Figure 4:
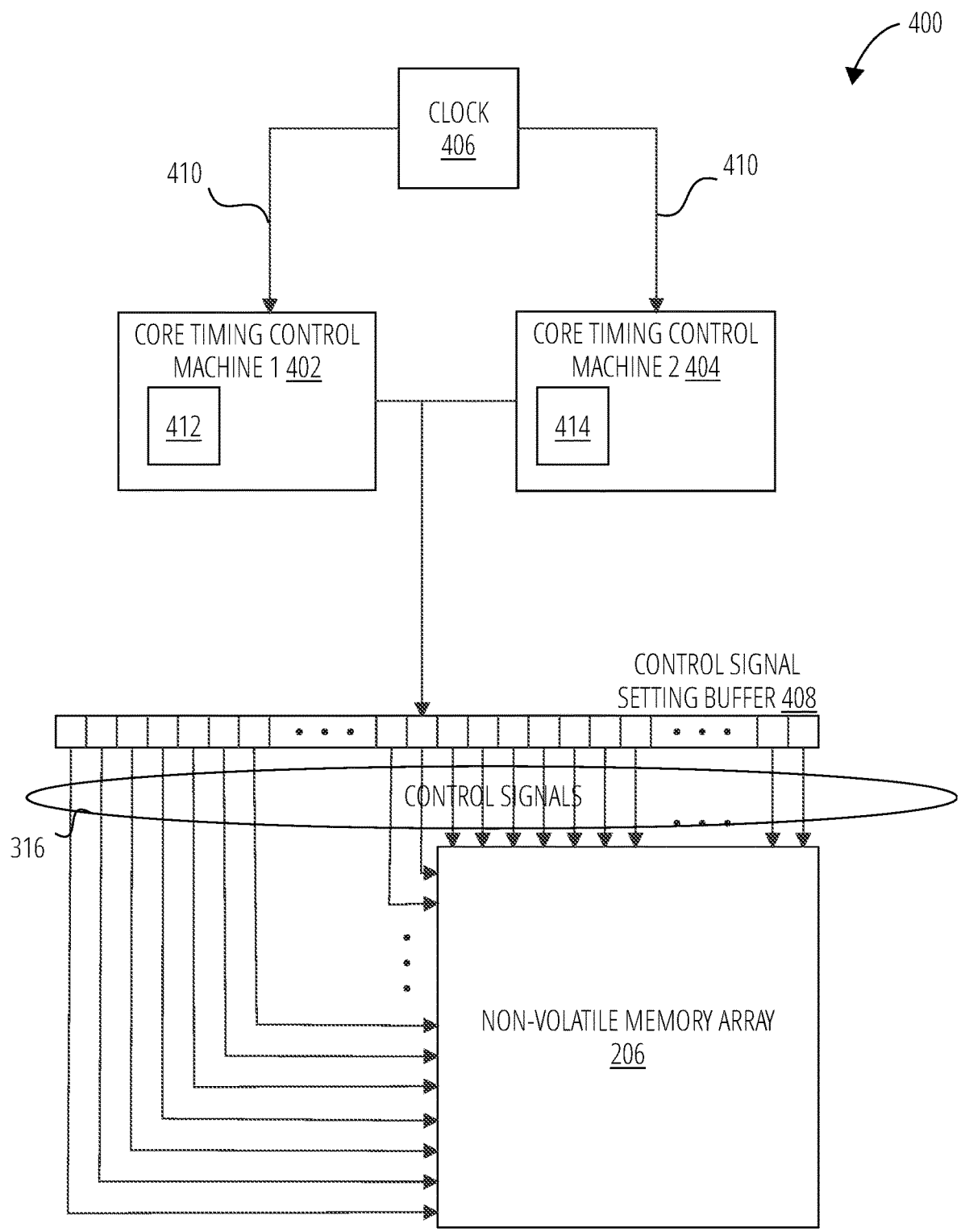
FIG. 4 illustrates a core timing control apparatus 400 in accordance with one embodiment.

FIG. 4 illustrates a core timing control apparatus 400 in accordance with one embodiment. The core timing control apparatus 400 comprises a non-volatile memory array 206, a core timing control machine 1 402, a core timing control machine 2 404, a clock 406, and a control signal setting buffer 408.

The non-volatile memory array 206 may operate as described with regard to FIG. 2. The non-volatile memory array 206 may further comprise a plurality of control signals 316. The control signals 316 may be configured to perform storage operations based on their settings and/or a storage operation timing sequence.

Core timing control machine 1 402 and core timing control machine 2 404 may each determine control signal values for the control signals 316 by executing firmware instructions in parallel. Parallel execution of firmware instructions is described below in relation to FIG. 5. The core timing control machine 1 402 and core timing control machine 2 404 may take turns executing subroutines based on direction from the clock 406, or clock 304, in certain embodiments. Thus, the core timing control machine 1 402 and core timing control machine 2 404 may execute different subroutines in parallel.

In one embodiment, the core timing control machines each include a separate instruction buffer. For example, core timing control machine 1 402 may include instruction buffer 412 and core timing control machine 2 404 may include instruction buffer 414. In the depicted embodiment instruction buffer 412 and instruction buffer 414 are independent. In another embodiment, the core timing control machine 1 402 and core timing control machine 2 404 may each access a shared instruction buffer.

Each of instruction buffer 412 and instruction buffer 414 store long firmware instruction. "Instruction buffer" refers to an area of a memory media configured to store a set of firmware instructions. In certain aspects, the memory media used for the instruction buffer may be read only memory (ROM), static random-access memory (SRAM), dynamic random-access memory (DRAM), or the like. In one aspect, an instruction buffer may include a pointer that identifies an address for a next firmware instruction that is to be executed. The address pointed to by the pointer may be an address in the instruction buffer and the address pointer may automatically advance to a next address after a firmware instruction is fetched for execution.

In one embodiment, the instruction buffer 412 and instruction buffer 414 are configured to hold firmware instructions such that each of core timing control machine 1 402 and core timing control machine 2 404 execute different subroutines in parallel. Each subroutine may be part of a different time segment in a timing sequence of a storage operation. For example, suppose a read operation is being performed in a memory die and the read operation includes four time segments, each of variable length (taking a variable number of clock cycles). The firmware instructions and associated subroutines in instruction buffer 412 may implement the control signals for a first time segment of the read operation. The firmware instructions and associated subroutines in instruction buffer 414 may implement the control signals for a second time segment (in a timing sequence) of the read operation. Since the clock 406 operates the core timing control machine 1 402 and core timing control machine 2 404 concurrently, the firmware instructions for the first time segment and the second time segment are determined in parallel. The core timing control machine 1 402 executes firmware instructions for the first time segment and the core timing control machine 2 404 executes firmware instructions for the second time segment. The settings are temporarily stored in the control signal setting buffer 408 in time segment order, so the first time segment control signals are set and then the second time segment control signal are set. Similarly, the core timing control machine 1 402 executes firmware instructions for the third time segment and the core timing control machine 2 404 executes firmware instructions for the fourth time segment. Thus, the core timing control machine 1 402 and core timing control machine 2 404 alternate in executing firmware instructions for successive time segments of a timing sequence for a storage operation.

The clock 406 may provide a clock signal 410 and may activate core timing control machine 1 402 and/or core timing control machine 2 404 for concurrent operation. In one embodiment, each core timing control machine operates for a time segment. Since the time segments may be of variable length if one of core timing control machine 1 402 and core timing control machine 2 404 finishes before the other, the one that finishes may perform no-op operations on each successive clock cycle until the other core timing control machine is finished. In this manner, first one core timing control machine may execute a subroutine then the other may execute a subroutine. In one embodiment, the clock 406 may manage a series of time segments of a timing sequence defined for a particular storage operation.

A result of firmware execution in the core timing control machines may be output to a control signal setting buffer 408. "Control signal setting buffer" refers to a set of hardware and/or software configured to define a location for temporarily storing control signal value for a plurality of control signals. In one aspect, a control signal setting buffer is a first-in-first-out queue data structure that holds a series of bits in which each bit represents a control signal value for a corresponding control signal on a next clock cycle. A control signal setting buffer may be implemented with logic gates, flip-flops, one or more registers, SRAM, or the like. In one aspect, control signal value or settings in the control signal setting buffer may activate or deactivate signal drivers of a die controller to implement storage operations on a non-volatile memory array. Each of the core timing control machine 1 402 and the core timing control machine 2 404 may set the values for the bits of the control signal setting buffer 408.

"Control signal value" refers to a value, indicator, flag, setting or the like that identifies whether a control signal is to have a high, one, or active voltage bias, or a low, zero, or inactive voltage bias. Where control signals are analog electronic signals, a control signal value may comprise a voltage level indicative of a one or a voltage level indicative of a zero.

Figure 5:
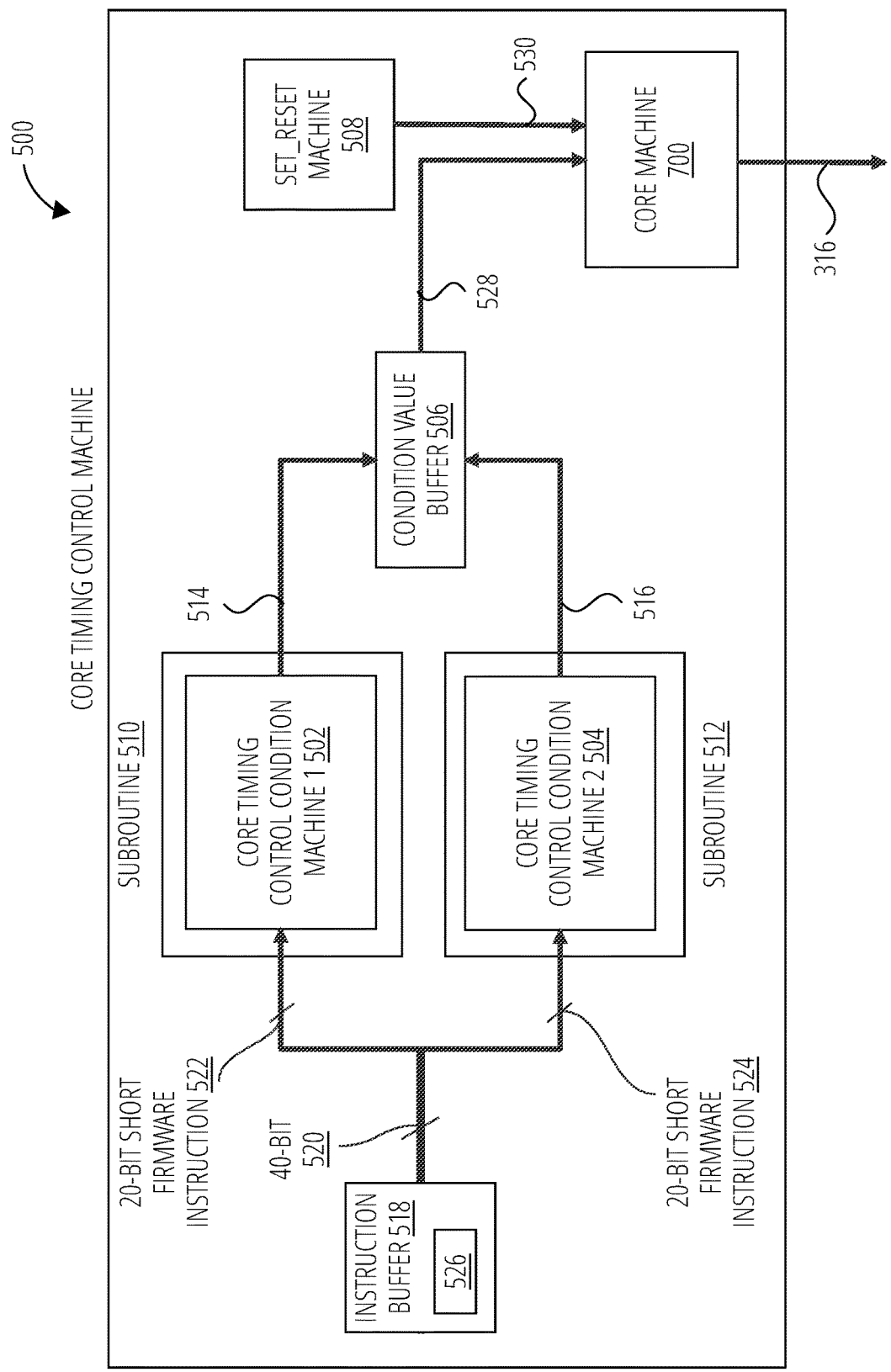
FIG. 5 illustrates a core timing control machine 500 in accordance with one embodiment.

FIG. 5 illustrates a core timing control machine 500, such as core timing control machine 1 402 and/or core timing control machine 2 404, in accordance with one embodiment. The core timing control machine 500 comprises a core timing control condition machine 1 502, a core timing control condition machine 2 504, a condition value buffer 506, a set_reset machine 508, and a core machine 700.

The core timing control machine 500 may execute short firmware instructions and/or long firmware instructions. "Core timing control machine" refers to any hardware, software, firmware, circuit, electronic component, module, logic, device, or apparatus configured, programmed, designed, arranged, or engineered to determine control signal values for a plurality of control signals for a die controller that executes a storage operation correlated to a timing sequence for the storage operation, the timing sequence comprising an ordered set of time segments. The core timing control machine is configured to determine control signal values for a plurality of control signals prior to the timing sequence advancing to a time segment that utilizes the control signal values. In one particular embodiment, the core timing control condition machine 1 502 and/or core timing control condition machine 2 504 are each configured to execute short firmware instructions and/or long firmware instructions.

"Long firmware instruction" refers to a type of firmware instruction designed to perform the function of a series of short firmware instructions. Another term for a long firmware instruction is complex firmware instruction. In one embodiment, a long firmware instruction may be configured to perform an arithmetic operation. In one embodiment, a long firmware instruction is forty bits and thus may require two 20-bit memory locations to store a single long firmware instruction. In one embodiment, long firmware instructions are divided into two 20-bit wide instructions and execute in a two clock cycles. In one embodiment, a long firmware instruction is used as a replacement for two or more short firmware instruction. In particular, where a set of short firmware instructions loads temporary registers and then performs arithmetic operations on values in the temporary registers in connection to constants and/or core timing control conditions, this set of short firmware instructions may be replaces by a single long firmware instruction.

"Short firmware instruction" refers to a type of firmware instruction designed to perform basic processing and operations such as loading a register or moving data from one register to another register. Another term for a short firmware instruction is simple firmware instruction. In one embodiment, a short firmware instruction is twenty bits and thus may require a single 20-bit memory location to store the short firmware instruction. In one embodiment, short firmware instructions are 20-bits wide and execute in a single clock cycle.

In one embodiment, the core timing control condition machine 1 502 and the core timing control condition machine 2 504 may each execute a separate subroutine, such as subroutine 510 and subroutine 512 of the set of firmware instructions to determine a core timing control condition value, such as core timing control condition value 514 and core timing control condition value 516 each represented by the subroutine 510 and subroutine 512, respectively. Alternatively, in one embodiment, core timing control machine 500 may include a single core timing control condition machine that may execute a subroutine of the set of firmware instructions to determine a core timing control condition value represented by the subroutine.

"Subroutine" refers to a set of ordered firmware instruction or machine code configured to perform a specific computing operation. In one aspect, a subroutine may be configured to evaluate a core timing control condition to determine a core timing control condition value. In one aspect, a subroutine evaluates a core timing control condition in relation to a particular time segment of a timing sequence of a storage operation.

"Core timing control condition" refers to a condition for a set of one or more control signals, predefined parameters, dynamic parameters, settings, and/or control signal values. In certain embodiments, a core timing control condition represents a state for a finite state machine. In one embodiment, a core timing control condition may be represented logically by an algebraic logic expression. In another aspect, a core timing control condition may be implemented using circuitry, logic, and/or firmware instructions.

"Core timing control condition machine" refers to any hardware, circuit, component, module, logic, device, or apparatus configured, programmed, designed, arranged, or engineered to execute firmware instructions that are configured to evaluate a core timing control condition and determine therefrom a core timing control condition value at a particular point in time. In certain embodiments, the core timing control condition machine may be referred to as a "CTC Conditional Machine," or "Condition Machine."

"Core timing control condition value" refers to a value for a particular core timing control condition. In one aspect, a core timing control condition value is a value at a particular time segment within a timing sequence of a storage operation. Core timing control condition values are associated with core timing control conditions. A value for a core timing control condition is a value at a particular point in time during operation of a die controller using the core timing control condition and may comprise a true value or a false value; or a binary one value or a binary zero value. Where a core timing control condition is represented logically by an algebraic logic expression, a core timing control condition value may comprise a value that results from evaluating the algebraic logic expression and may be either a one or a zero.

Within the instruction buffer 518, the firmware instruction may be organized, and ordered, in a variety of different configurations depending on the embodiment. In one embodiment, the firmware instruction are organized within the instruction buffer 518 as an ordered set of 40-bit long firmware instructions 520. Each 40-bit long firmware instruction 520 may comprise a pair of firmware instructions such as 20-bit short firmware instruction 522 and a 20-bit short firmware instruction 524. The 20-bit short firmware instruction 522 and 20-bit short firmware instruction 524 may each share a common address 526 within the instruction buffer 518. "Common address" refers to an address for a firmware instruction used by a processor, logic or ASIC to reference two or more firmware instructions that are next to be executed.

In one embodiment, the common address 526 is implicit and based on how the firmware instruction in the instruction buffer 518 are organized such that firmware instructions can be executed in a predefined order that keeps the core timing control machine operating properly. In another embodiment, the core timing control machine 500 includes logic (not shown) that provides the common address 526 for use by the core timing control condition machine 1 502 and core timing control condition machine 2 504 in order to execute the appropriate subroutines in parallel.

In some embodiments, the instruction buffer 518 may be 40-bits wide (e.g., each entry is forty bits) and firmware instructions may be organized into pairs of firmware instructions having a common address 526. The pair of firmware instructions may reside side by side in one row of the instruction buffer 518 and be addressable by a common address 526. For example, bits 0 through 19 at one common address 526 may hold one 20-bit short firmware instruction 522, and bits 20 through 39 may hold the other 20-bit short firmware instruction 524 of the pair. By using a single 40-bit long firmware instruction 520, the core timing control machine 500 reduces the time required to decode each firmware instruction, similarly, less logic is required in the core timing control machine 500 to decode addresses for the firmware instructions because pairs of firmware instructions may share a common address.

Short firmware instructions and long firmware instructions may be organized in different ways in the instruction buffer 518. In one embodiment, short firmware instructions occupy 20 bits of the instruction buffer 518 and long firmware instruction may occupy 40 bits of memory. In embodiments, in which each core timing control condition machine executes a different subroutine, long firmware instructions may be divided into two parts and occupy two successive memory locations such that they are both directed to the same core timing control condition machine for execution.

In one embodiment, the core timing control condition machines may execute firmware instructions, such as 20-bit short firmware instruction 522 and 20-bit short firmware instruction 524, in parallel to determine the appropriate core timing control condition value 514 and/or core timing control condition value 516. The core timing control condition value from each core timing control condition machine may be placed in a condition value buffer 506 before being transmitted to the set_reset machine 508. "Condition value buffer" refers to a set of hardware and/or software configured to define a location for temporarily storing a plurality of core timing control condition values. In one aspect, a condition value buffer is a first-in-first-out queue data structure that holds a series of bits in which each bit represents a core timing control condition value for a corresponding core timing control condition. A condition value buffer may be implemented with logic gates, flip-flops, one or more registers, SRAM, or the like. In one aspect, a condition value buffer comprises a location for temporarily storing core timing control condition values determined by a core timing control condition machine.

In one embodiment, core timing control condition machine 1 502 may execute a first subroutine 510 of the firmware instructions to determine the core timing control condition value 514 for the core timing control condition represented by the subroutine 510. This core timing control condition value 514 may be stored in the condition value buffer 506. Core timing control condition machine 2 504 may determine a core timing control condition value 516 represented by a second subroutine 512 of the firmware instructions and may store the core timing control condition value 516 in the condition value buffer 506. The core timing control condition machine 1 502 and core timing control condition machine 2 504 may execute concurrent with each other. The subroutine 510 and subroutine 512 executed by the core timing control condition machine 1 502 and core timing control condition machine 2 504 represent core timing control conditions.

The set_reset machine 508 may determine a set_reset value 530 to assign to one or more control signals 316 based on a corresponding core timing control condition value 528, from the condition value buffer 506, being true, or a binary one, or set. "Set_reset machine" refers to any hardware, software, firmware, circuit, electronic component, module, logic, device, or apparatus configured, programmed, designed, arranged, or engineered to determine a control signal value for a particular control signal, or group of particular control signals, for a particular time segment of a timing sequence of a storage operation with a particular core timing control condition. The determined control signal value is referred to herein as a set_reset value and may have a value of one for a high value, or zero for a low value. In one aspect, if a particular core timing control condition evaluates to true or one, then the set_reset value for this core timing control condition during the particular time segment is the new control signal value for the particular control signal. If the particular core timing control condition evaluates to false or zero, then the set_reset value for this core timing control condition during the particular time segment retains its current control signal value for the particular control signal.

"Set_reset value" refers to a value of one or zero for a particular control signal, or group of particular control signals associated with a particular core timing control condition. The set_reset machine 508 may determine a particular set_reset value 530 to be assigned in response to the core timing control condition value 514 being true or false.

The core machine 700 may determine the settings for control signals 316 during a clock cycle based on the core timing control condition value 528 from the condition value buffer 506, and the set_reset value 530 from the set_reset machine 508. The core machine 700 may then assign the appropriate settings to one or more control signals 316. The core machine 700 is described in further detail with regard to FIG. 7.

Figure 6:
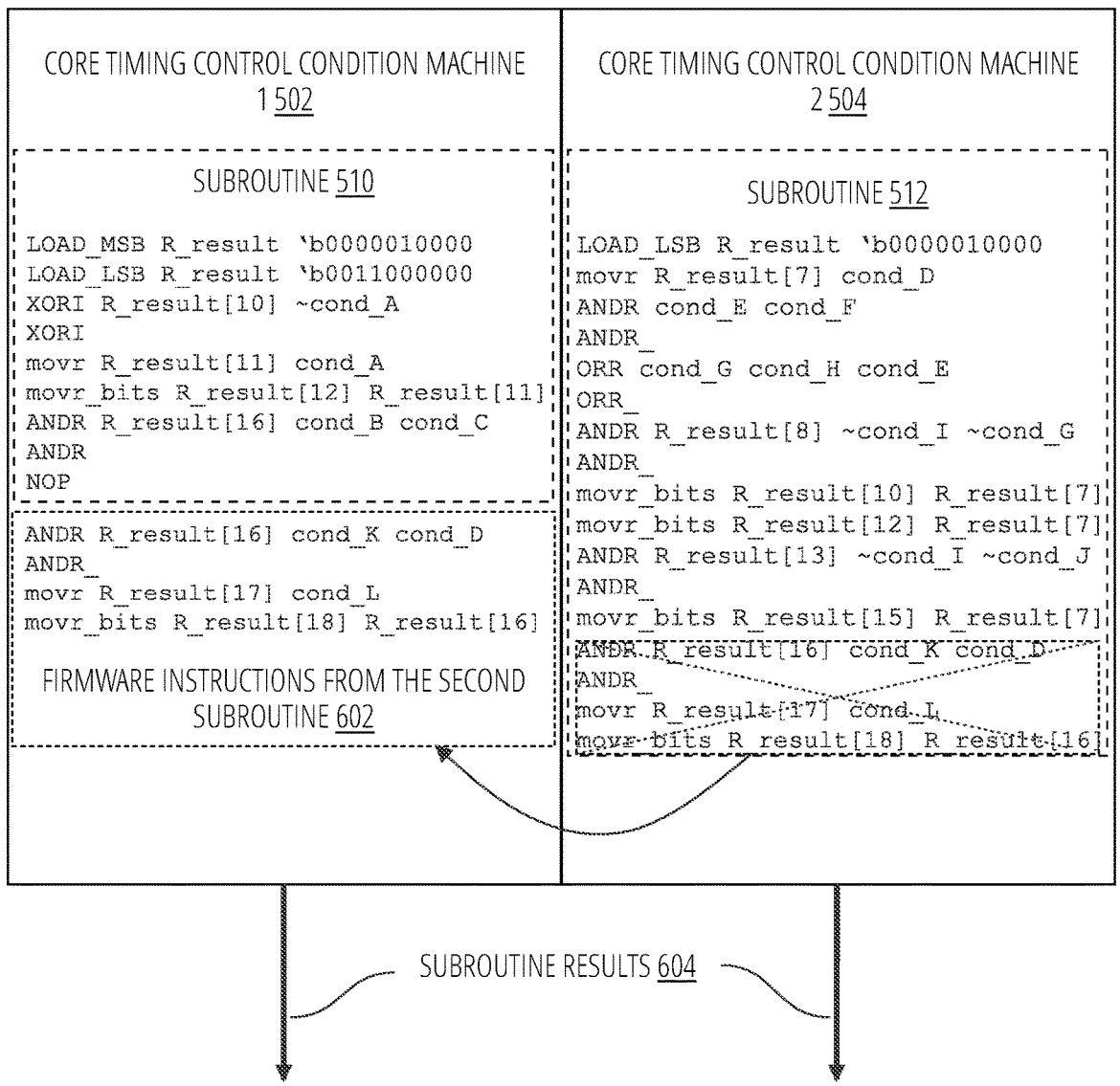
FIG. 6 illustrates an example of concurrent subroutine execution 600 in accordance with one embodiment.

FIG. 6 illustrates an example of concurrent subroutine execution 600 that may be performed by the core timing control condition machine 1 502 and core timing control condition machine 2 504 introduced in FIG. 5. As illustrated above, core timing control condition machine 1 502 may begin executing subroutine 510 and core timing control condition machine 2 504 may begin executing subroutine 512. In the example illustrated here, subroutine 510 is shorter (i.e., has fewer lines of code) than subroutine 512. Specifically, subroutine 510 has nine lines of code and subroutine 512 has seventeen lines, as an example.

In such a case, core timing control condition machine 1 502 may be configured to execute the code of subroutine 510 and, once that is complete, may be configured to execute some portion of the unexecuted lines from subroutine 512. For subroutine 510 having nine instructions (N firmware instructions) and subroutine 512 having seventeen (M firmware instructions), core timing control condition machine 1 502 may be configured to execute its nine instructions, in parallel with core timing control condition machine 2 504 executing the first nine instructions of subroutine 512. Once the nine instructions in subroutine 510 are executed, core timing control condition machine 1 502 may execute all or some portion of the eight instructions core timing control condition machine 2 504 has not yet executed.

In one embodiment, the division of firmware instructions of different subroutines between core timing control condition machine 1 502 and core timing control condition machine 2 504 may be accomplished by a compiler or assembler that converts an original set of subroutines into a set in which core timing control condition machines share execution of firmware instruction of separate subroutines.

The number of instructions executed by core timing control condition machine 1 502 from core timing control condition machine 2 504 may be determined based on attributes such as dependencies between instructions, or what number of firmware instructions may best balance the workload between the two machines, or what may allow the subroutine results 604 to be most quickly achieved. "Subroutine result" refers to a result after executing a series of firmware instruction of a subroutine.

Firmware instructions from the second subroutine 602 executed by core timing control condition machine 1 502 as illustrated include the final four lines of subroutine 512, (M−N)/2. Transferring these four lines to core timing control condition machine 1 502 allows core timing control condition machine 1 502 to execute firmware instructions/machine code that does not depend on results that core timing control condition machine 2 504 has not yet determined, while ensuring that core timing control condition machine 2 504 will not sitting idle for one or more clock cycles, waiting for core timing control condition machine 1 502 to complete. In one embodiment, core timing control condition machine 1 502 may execute all eight remaining lines of subroutine 512, if another independent subroutine is queued for execution on core timing control condition machine 2 504.

Figure 7:
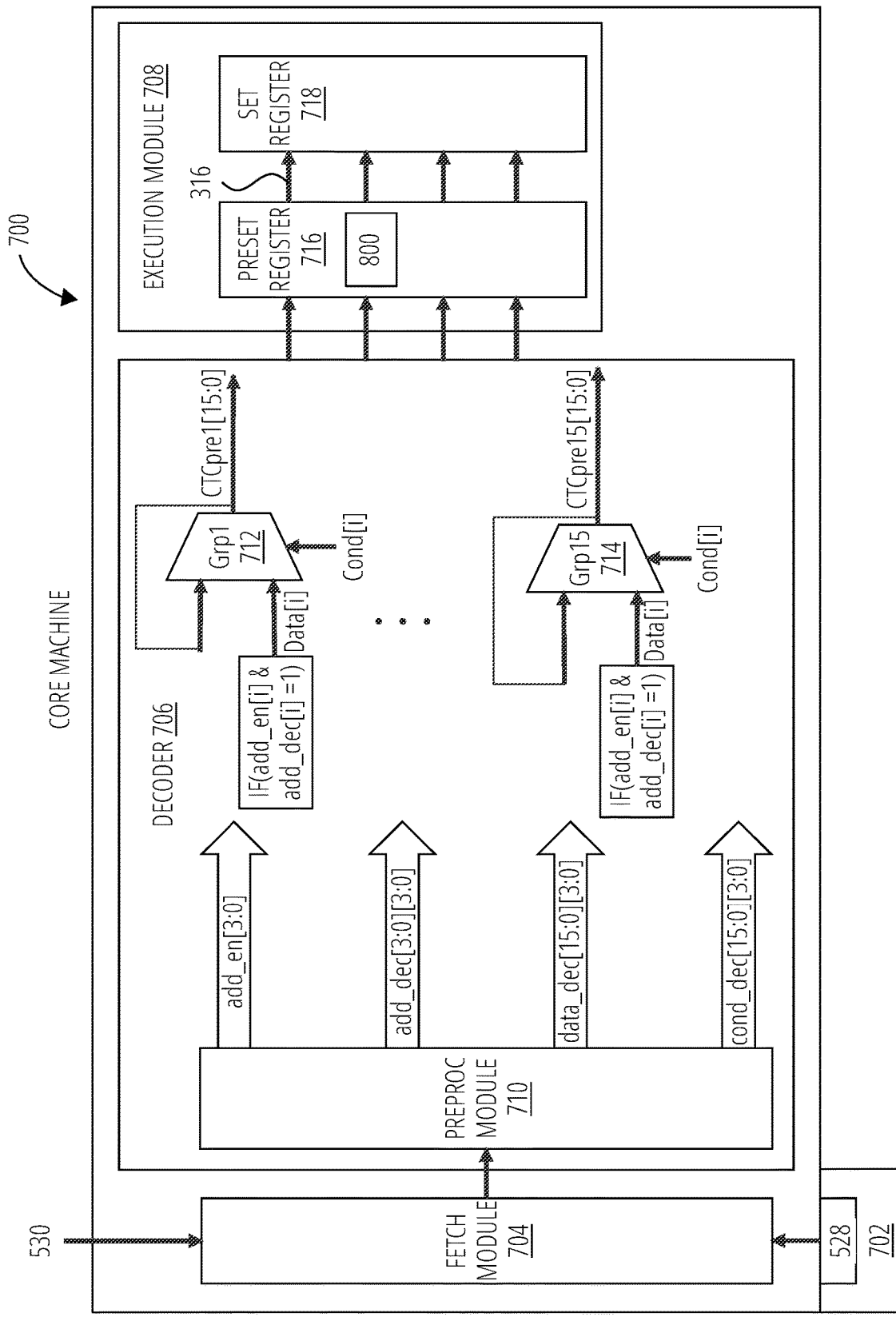
FIG. 7 illustrates a core machine 700 in accordance with one embodiment.

FIG. 7 illustrates a core machine 700 in accordance with one embodiment. The core machine 700 may comprise a condition value buffer 702, a fetch module 704, a decoder 706, and an execution module 708. "Core machine" refers to any hardware, software, firmware, circuit, electronic component, module, logic, device, or apparatus configured, programmed, designed, arranged, or engineered to determine settings for a plurality of control signals, based on a core timing control condition value provided by a core timing control machine and a set_reset value from a set_reset machine and assign the settings to a plurality of control signals.

The condition value buffer 702 incorporated into the core machine 700 may be in place of, or in addition to, the condition value buffer 506 introduced in FIG. 5. The condition value buffer 702 may be organized such that a first core timing control condition value placed in the condition value buffer 702 is the first core timing control condition value retrieved as the core timing control condition value 528 sent to the fetch module 704. In other words, the condition value buffer 702 may be a first-in-first-out buffer or FIFO.

The fetch module 704 may retrieve the core timing control condition value 528 from the condition value buffer 702 and the set_reset value 530 provided by the set_reset machine 508 introduced in FIG. 5. "Fetch module" refers to any hardware, circuit, component, module, logic, device, or apparatus configured, programmed, designed, arranged, or engineered to retrieve a core timing control condition value from an input buffer and a set_reset value provided by a set_reset machine. One or both of the core timing control condition value 528 and set_reset value 530 may be passed by the fetch module 704 to the decoder 706. "Decoder" refers to any hardware, circuit, component, module, logic, device, or apparatus configured, programmed, designed, arranged, or engineered to associate the set_reset values with the plurality of control signals and to determine whether a control signal changes from a prior value to a new set_reset value or remains unchanged.

The decoder 706 may comprise a preprocessing module 710 and a set of multiplexer (MUX) groups. A MUX is a functional module that takes in two or more data inputs and a select input, and outputs one of the data inputs based on the value of the select input. The decoder 706 MUX groups are illustrated as MUX group 1 712 through MUX group 15 714. In one embodiment, the MUX groups may be implemented using combinational logic.

The preprocessing module 710 may provide outputs in the form of address enable signals, address decoder signals, data decoder signals, and condition decoder signals based on the values from the fetch module 704. The decoder 706 uses the MUX groups to determine a control signal setting for sets of control signals organized into groups. In this manner, the decoder 706 may associate the set_reset value 530 with a plurality of control signals. Thus, the decoder 706 may determine whether a control signal changes from a previous value to a new set_reset value or remains unchanged. The MUX groups are configured to latch a previous value as needed by feeding their outputs back as inputs. The decoder may organize the control signals into groups and associate the set_reset value 530 such that four or more groups of control signals are set to a new set_reset value or remain unchanged in a single clock cycle.

"Execution module" refers to any hardware, circuit, component, module, logic, device, or apparatus configured, programmed, designed, arranged, or engineered to modify a control signal setting buffer to include control settings for a plurality of control signals for use in a subsequent clock cycle. The execution module 708 may modify the control signal setting buffer to include control settings for use by the control signals on a subsequent clock cycle. This may be accomplished by organizing the settings within a preset register 716 which then pushes the settings to a set register 718. The preset register 716 may comprise at least one control signal setting buffer MUX/latch group 800, illustrated in more detail in FIG. 8.

Figure 8:
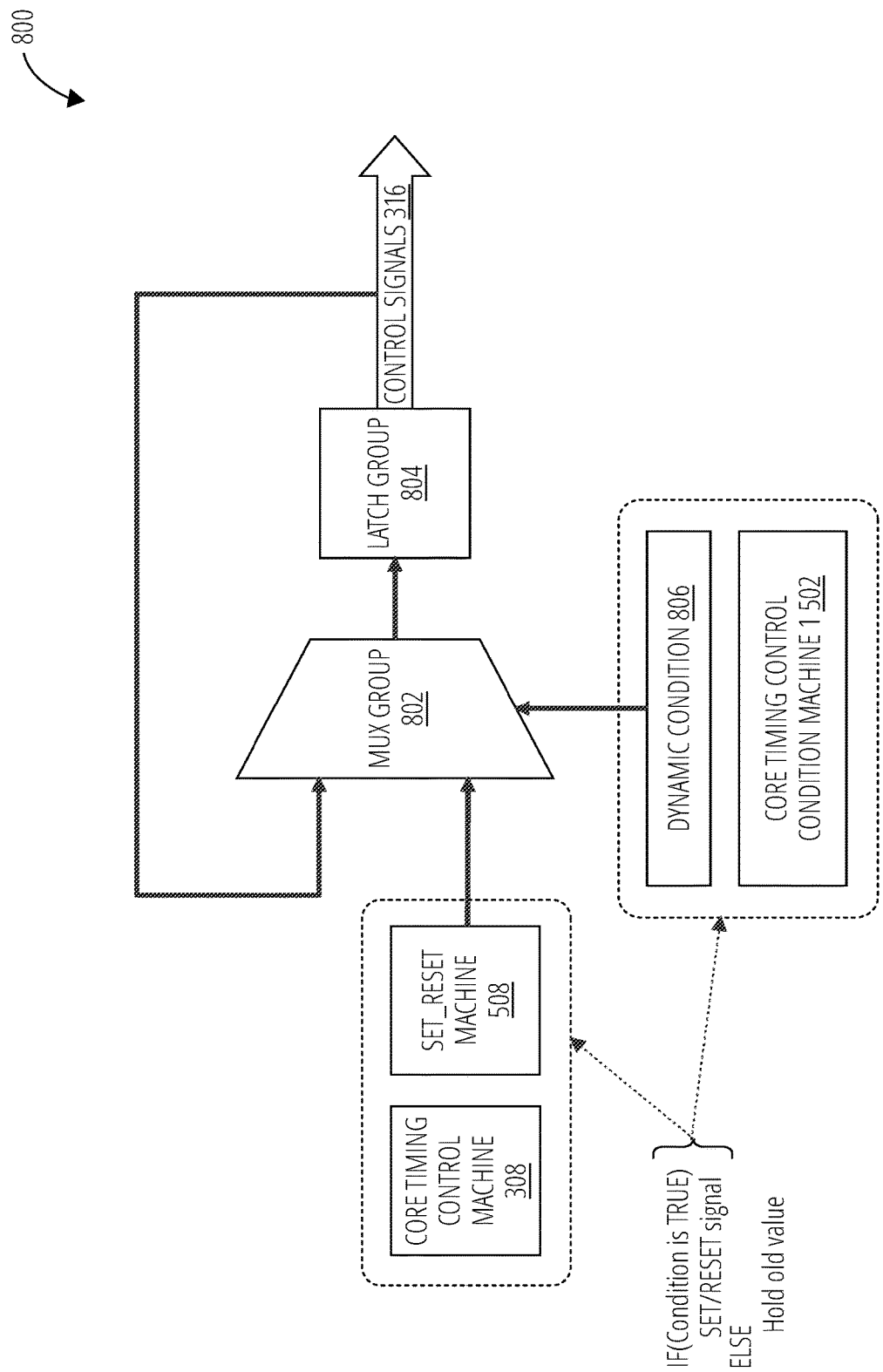
FIG. 8 illustrates a control signal setting buffer MUX/latch group 800 in accordance with one embodiment.

FIG. 8 illustrates a control signal setting buffer MUX/latch group 800 in accordance with one embodiment. The control signal setting buffer MUX/latch group 800 may comprise a MUX group 802 and latch group 804. The MUX group 802 and latch group 804 may be used to buffer control signals before they are processed onto control signals 316 running to the non-volatile memory array 206 as illustrated in FIG. 2.

The core timing control condition machine 1 502 (illustrated) or the core timing control condition machine 2 504 (not illustrated) may provide a dynamic condition 806 that may be used as the select signal for the MUX group 802. One input to the MUX group 802 may comprise the signals resulting from the core timing control machine 308 and the set_reset machine 508. In one embodiment, if the dynamic condition 806 evaluates as TRUE, the MUX group 802 output is set/reset to the data from the core timing control machine 308 and set_reset machine 508. This data is latched by the latch group 804 and is then transmitted as control signals 316.

Should the dynamic condition 806 evaluate to FALSE, the current control signal 316 being output from the latch group 804 and fed back as input to the MUX group 802 may be selected as the new MUX group 802 output, allowing the current values for the control signal 316 to be held instead of set or reset.

Figure 9:
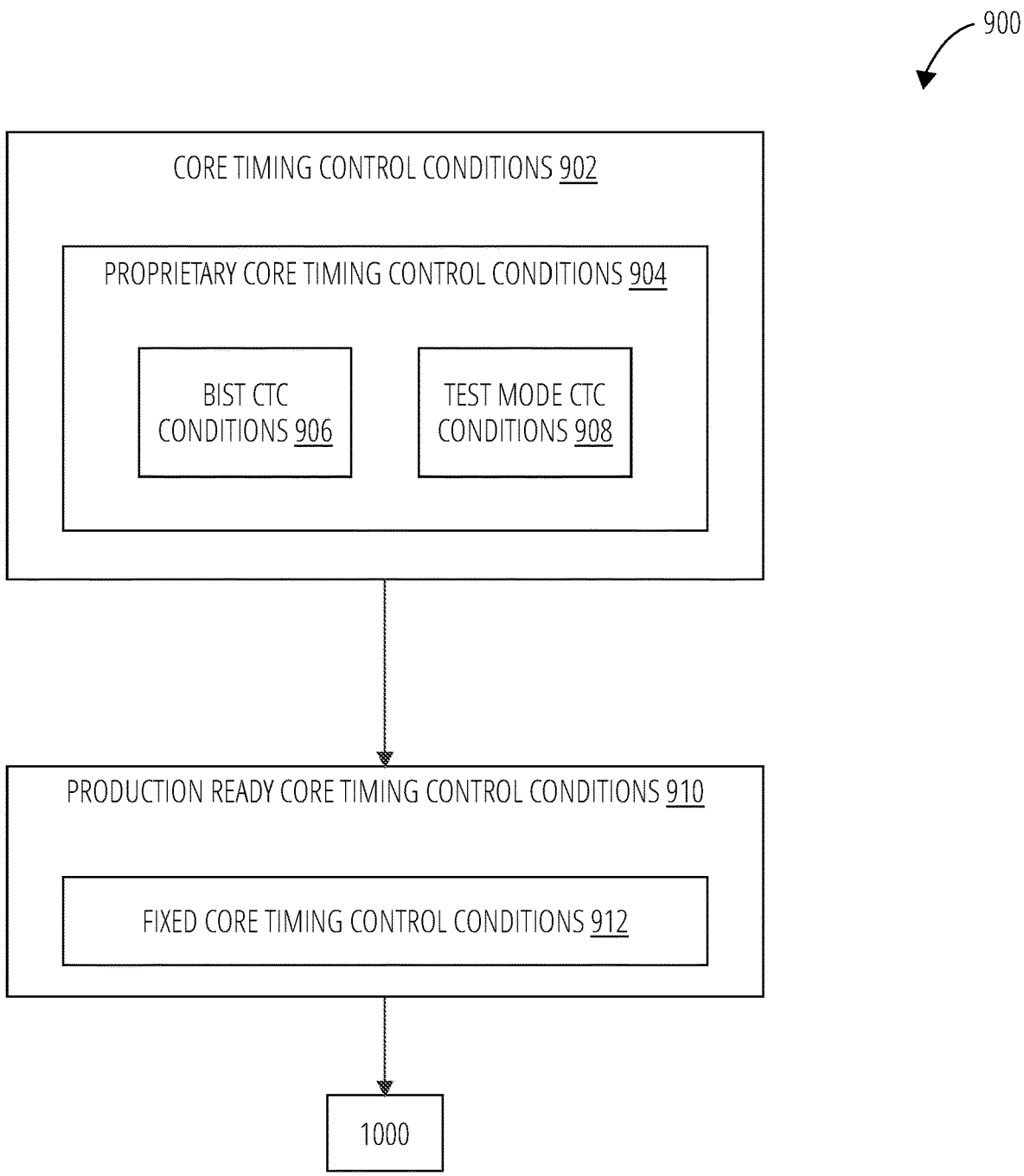
FIG. 9 illustrates a core timing control condition reduction flow 900 in accordance with one embodiment.

FIG. 9 illustrates a core timing control condition reduction flow 900 in accordance with one embodiment. The core timing control condition reduction flow 900 illustrates how core timing control conditions 902 intended for use in conventional storage systems may be reduced to a different set, often a smaller set, of production ready core timing control conditions 910 in order to save on-die storage space, reduce execution latency, and keep proprietary information about a die controller design, such as proprietary core timing control conditions, from being shared with, or discoverable, by others who may operate a storage device 200 that includes the die controller once the storage device 200 is sold into a marketplace.

The core timing control conditions 902 may comprise a set of proprietary core timing control conditions 904. These may include built in self test (BIST) core timing control conditions 906 and test mode core timing control conditions 908. "Proprietary core timing control condition" refers to core timing control conditions that are used by an integrated semiconductor manufacturer to test a memory die for proper operation and/or debug operation of a memory die before the memory die is delivered to a customer or before large scale production is initiated. "Built in self test (BIST) core timing control condition" refers to a core timing control condition specifically designed or configured for use in self-test operations that a memory die may perform during research and design activities and/or during quality control reviews of the memory die. Built in self test (BIST) core timing control conditions may include certain confidential and proprietary information about how a memory die is designed or configured that a memory die manufacturer desires to keep confidential.

"Test mode core timing control condition" refers to a core timing control condition specifically designed or configured for use in testing, diagnostic, or other research and development activities or quality control activities in relation to a memory die. Test mode core timing control conditions may include certain confidential and/or proprietary information about how a memory die is designed or configured that a memory die manufacturer desires to keep confidential.

In one embodiment, the proprietary core timing control conditions 904, built in self test core timing control conditions 906, and test mode core timing control conditions 908 may be used only during manufacturing and testing phases, and may not have dynamic values or may not be needed once the device is delivered to a customer for normal operations. For this reason, a manufacturer may desire that all, or some portion, of the proprietary core timing control conditions 904 be left out of the production ready core timing control conditions 910 completely. "Production ready core timing control condition" refers to a core timing control condition that is used in a product when the product is in use by a customer.

In one embodiment, in order to remove proprietary core timing control conditions 904 from the core timing control conditions 902, the core timing control conditions 902 may be evaluated with one or more, or all, of the proprietary core timing control conditions 904 set to zero. Such a setting may represent a value for a proprietary core timing control conditions 904 during normal operation. For other proprietary core timing control conditions 904 a setting for normal operation of a storage device 200 may be for the proprietary core timing control conditions 904 to have a value of 1. In such cases, the proprietary core timing control conditions 904 may be removed from core timing control conditions 902 by setting those proprietary core timing control conditions 904 to a value of 1.

Examples of how setting a proprietary core timing control conditions 904 to its value for normal operation, may simplify the production ready core timing control conditions 910 when compared with the core timing control conditions 902 are shown in the table below.

| Condition | Reduced Condition |
|---|---|
| ~(CMD_A1) | 1 |
| ~(CMD_A2 & PB_ALLVSS) && FD_CHANNEL_CLEAN | FD_CHANNEL_CLEAN |

The ~( ) notation indicates a logical inversion (from "0" to "1" and vice versa). The & and && symbols indicate logical AND operations, where the result is "1" if all operands are "1". CMD_A1 and CMD_A2 may be proprietary core timing control conditions 904 associated with test mode commands, which may both result in a value of "0" in user mode.

By setting the proprietary core timing control conditions 904 to their value during user mode and evaluating the core timing control conditions 902, the set of core timing control conditions 902 may be reduced and/or logically simplified. Performing this conversion, evaluation, and/or reduction, in one embodiment, produces production ready core timing control conditions 910. Advantageously, the production ready core timing control conditions 910 includes a smaller set of core timing control conditions and proprietary information that the core timing control conditions may include or convey or imply is removed. Having fewer core timing control conditions 902, such as production ready core timing control conditions 910, means that fewer firmware instructions will be needed to represent the core timing control conditions 902, such as production ready core timing control conditions 910. In certain embodiments, one core timing control condition may be implemented using, on average, four firmware instructions.

In one embodiment, the production ready core timing control conditions 910 may include fixed core timing control conditions 912. "Fixed core timing control condition" refers to a core timing control condition having one or more control signals, predefined parameters, settings, and/or control signal values that are set when an electronic device comprising fixed core timing control condition first powers on (Power on Reset (POR). After the electronic device powers on or reaches a steady state after a reset operation, the control signals and other parameters for the fixed core timing control condition are fixed, set, and unchanging. Consequently, once a fixed core timing control condition is evaluated to its value, that value also remains unchanged regardless of other state changes or operations performed by the electronic device.

Once the core timing control conditions 902 for a die controller are converted into the production ready core timing control conditions 910 for the die controller, the production ready core timing control conditions 910 may be used to generate a set of firmware instructions. The firmware instructions may be further modified to continue reducing the storage space needed to house them on the memory die as described with regard to FIG. 10.

Figure 10:
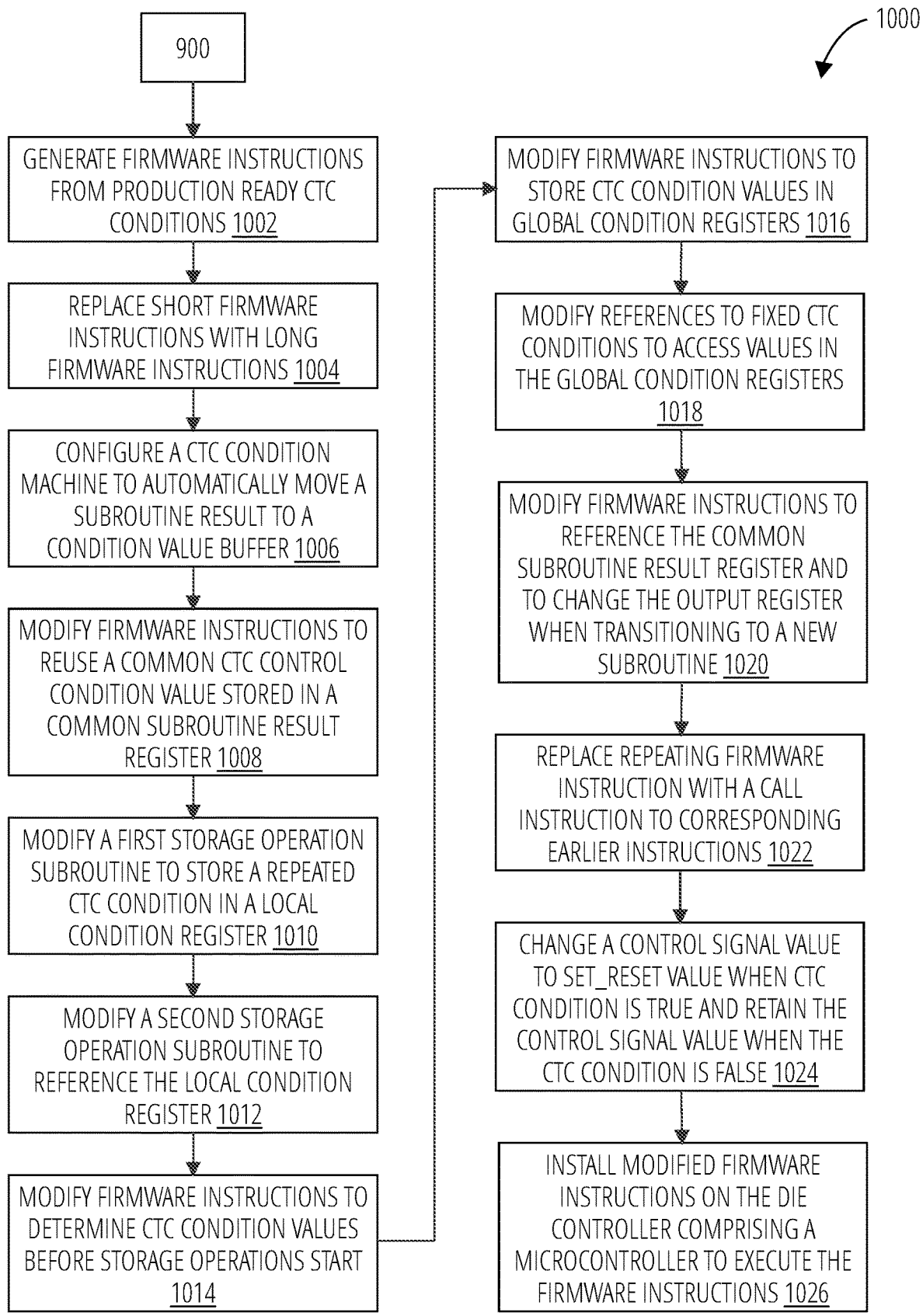
FIG. 10 illustrates a routine for reducing firmware size 1000 in accordance with one embodiment.

FIG. 10 illustrates a routine for reducing firmware size 1000 in accordance with one embodiment. Firmware instructions are created in block 1002 from the production ready core timing control conditions 910 generated through the core timing control condition reduction flow 900 illustrated in FIG. 9. In certain embodiments, firmware instructions may then be reduced as described below.

In block 1004, two or more short firmware instructions from the generated firmware instructions may be replaced with a single long firmware instruction. In one embodiment, a simplified firmware command structure may be used. In this manner, a single long firmware instruction may be developed that takes less storage space than the two or more short firmware instructions replaced.

In block 1006, the core timing control machine may automatically move a subroutine result to a condition value buffer when the core timing control machine begins executing a subsequent subroutine. In this manner, the subroutine result may be available immediately for use, rather than taking additional clock cycles and instructions to be pushed to an output buffer.

In block 1008, firmware instructions referencing common core timing control conditions within a common subroutine may be modified to reuse a value for the common core timing control condition, which may be stored in a common subroutine result register. "Subroutine result register" refers to a register used to hold a result of one or more computing operations of a subroutine. "Common subroutine result register" refers to a subroutine result register shared by more than one subroutine. In this manner, results of a calculation may be reused through a load or move command, which may take a single clock cycle instead of the multiple clock cycles that may be used for the repeated calculation.

In block 1010, a first firmware instruction of a first subroutine for a storage operation may be modified to store a repeated core timing control condition in a local condition register. "Repeated core timing control condition" refers to a core timing control condition that occurs more than once in two or more subroutines of set of firmware instructions. In one aspect, the repeated core timing control condition occurs in more than one subroutine that are executed within a single time segment. "Local condition register" refers to a register configured to storage a core timing control condition value for a core timing control condition. A local condition register is accessible by firmware instructions in each subroutine of particular time segment of a timing sequence. In one aspect, a local condition register comprises 20 bits. Then in block 1012, a second firmware instruction of a second subroutine for the storage operation may be modified to reference the value for the repeated core timing control condition stored in the local condition register. In this manner, results of a calculation may be reused through a load or move command, which may take a single clock cycle instead of the multiple clock cycles that may be used for the repeated calculation.

In block 1014, firmware instructions may be modified to determine core timing control condition values for fixed core timing control conditions before implementing storage operations. The firmware instructions may be further modified in block 1016 to store the core timing control condition values in global condition registers of block 1016. In this manner, results of a calculation may be reused through a load or move command, which may take a single clock cycle instead of the multiple clock cycles that may be used for the repeated calculation.

References to fixed core timing control conditions may be modified in block 1018 to access the values in the global condition registers. "Global condition register" refers to a register configured to storage a core timing control condition value for a fixed core timing control condition. A global condition register is accessible by firmware instructions in each subroutine of a set of firmware instructions. In one aspect, a global condition register comprises 20 bits. The firmware instructions may be further modified in block 1020 such that each subroutine may reference the common subroutine result register, and the core timing control machine may automatically change an output register associated with the common subroutine result register in response to the core timing control machine transitioning from executing the first subroutine to executing the second subroutine.

In block 1022, firmware instructions in the second subroutine that are repetitive may be replaced with a call instruction to corresponding firmware instructions in the first subroutine, eliminating repetitive firmware instruction. "Call instruction" refers to a firmware instruction configured to cause execution of firmware instruction to move to a set of firmware instruction set forth in another subroutine. By using a call instruction certain sets of firmware instructions that may have been duplicated are replaced with call instructions such that a single set of firmware instructions are used and other instances where these same firmware instructions are to be executed are implemented by reference to the single set of firmware instructions.

In block 1024, a core timing control machine may be configured to change a control signal value to a set_reset value in response to a corresponding core timing control condition evaluating to true and to retain the control signal value in response to the corresponding core timing control condition evaluating to false.

Finally, in block 1026, the modified firmware instructions may be installed on a die controller. The die controller may operate as described for the die controller 300 of FIG. 3. The die controller may comprise a microcontroller that executes the modified firmware instructions.

Figure 11:
FIG. 11 illustrates example firmware instruction modifications 1100 in accordance with one embodiment.

FIG. 11 illustrates example firmware instruction modifications 1100 in accordance with one embodiment. The before and after columns illustrate how firmware instructions may be simplified following the steps of the routine for reducing firmware size 1000 in FIG. 10.

A set of firmware instructions may be modified such that each subroutine references a common subroutine result register. A core timing control machine may automatically change an output register associated with the common subroutine result register in response to the core timing control machine transitioning from executing the first subroutine to executing the second subroutine.

The actions of block 1006 may result in an out command 1102 being unnecessary to provide the subroutine result register values. As a result, multiple instructions and therefore clock cycles may be eliminated from stored firmware code and operational latency. This may be accomplished by configuring core timing control condition machine to automatically move a subroutine result to a condition value buffer, in response to the core timing control condition machine initiating execution of a subsequent subroutine. The core timing control machine may be further configured to change a control signal value to a set_reset value in response to a corresponding core timing control condition evaluating to true and to retain the control signal value in response to the corresponding core timing control condition evaluating to false.

In one embodiment, two or more short firmware instructions may be replaced with a single long firmware instruction, as previously described. The actions in block 1008 may result in the ability to reuse common core timing control condition values within a common subroutine 1104. A condition calculated within a subroutine may be stored in a common subroutine result register and may be moved into a new location instead of being recalculated for that location. Thus, the firmware instruction referencing a common core timing control condition within a common subroutine may be modified to reuse the common subroutine result register, simplifying the firmware code.

The actions beginning in block 1010 may result in the ability to store values from a subroutine in a repeated core timing control condition stored in local condition register 1106. The die controller may then reuse condition values from a previous subroutine 1108 rather than recalculate those values. A first firmware instruction of a first subroutine for a storage operation may be modified to provide a repeated core timing control condition stored in local condition register 1106. A second firmware instruction of a second subroutine for the storage operation may be modified to reference a value for the repeated core timing control condition from the local condition register. It may be reused, simplifying the code as shown. A similar simplification may involve reusing fixed core timing control conditions as values that may be accessed in a global condition register.

Figure 12:
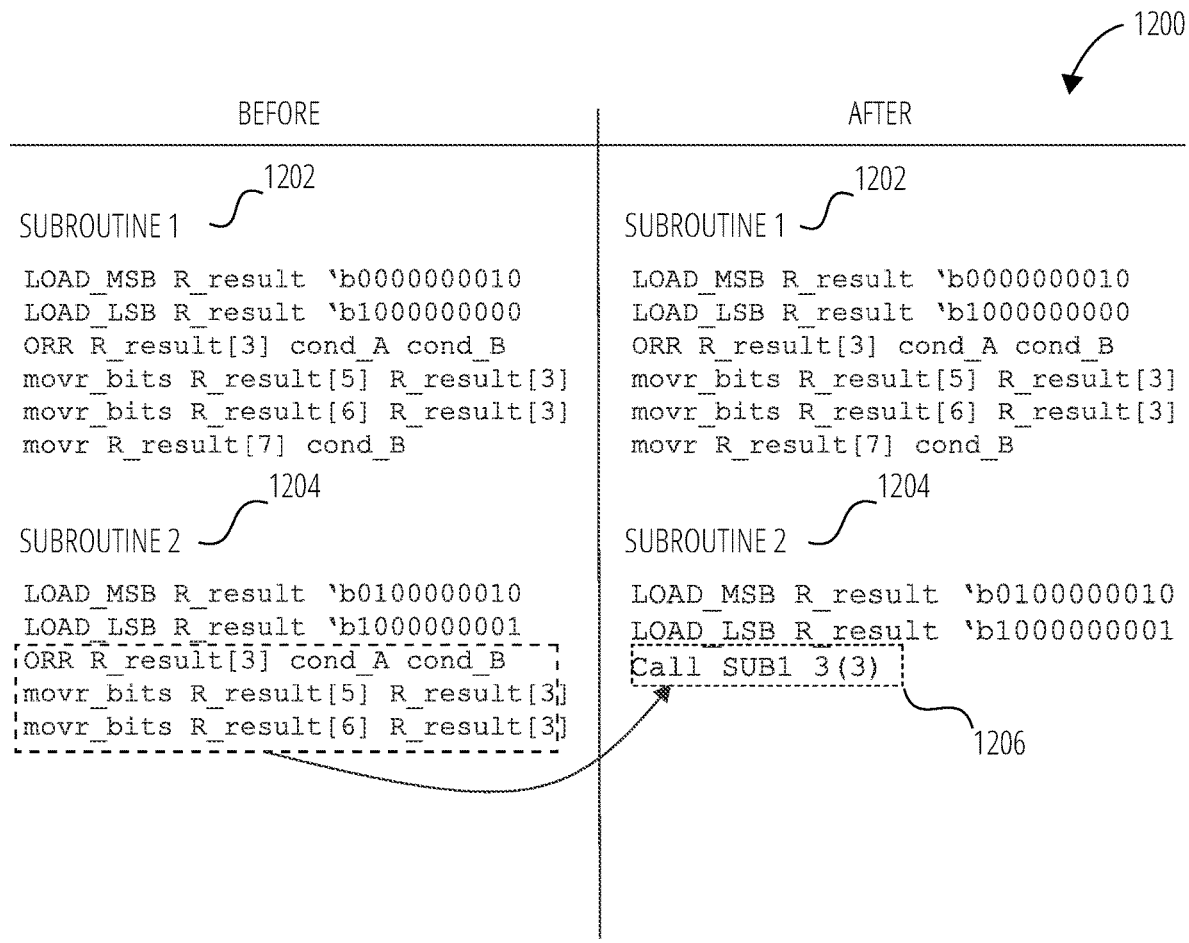
FIG. 12 illustrates example firmware instruction modifications 1200 in accordance with one embodiment.

FIG. 12 illustrates example firmware instruction modifications 1200 in accordance with one embodiment. The before and after columns illustrate how firmware instructions may be simplified following the steps of the routine for reducing firmware size 1000 in FIG. 10.

The actions beginning in block 1022 may result in firmware instructions in a second subroutine 1204 that are repetitive may be replaced with a call instruction 1206 to corresponding firmware instructions in the first subroutine, eliminating repetitive firmware instruction. In this example, three lines are removed from second subroutine 1204 and replaced by the call instruction 1206. In the example, the call instruction 1206 directs a processor or decoder to execute three instructions starting at line 3 in subroutine 1 1202.

Figure 13:
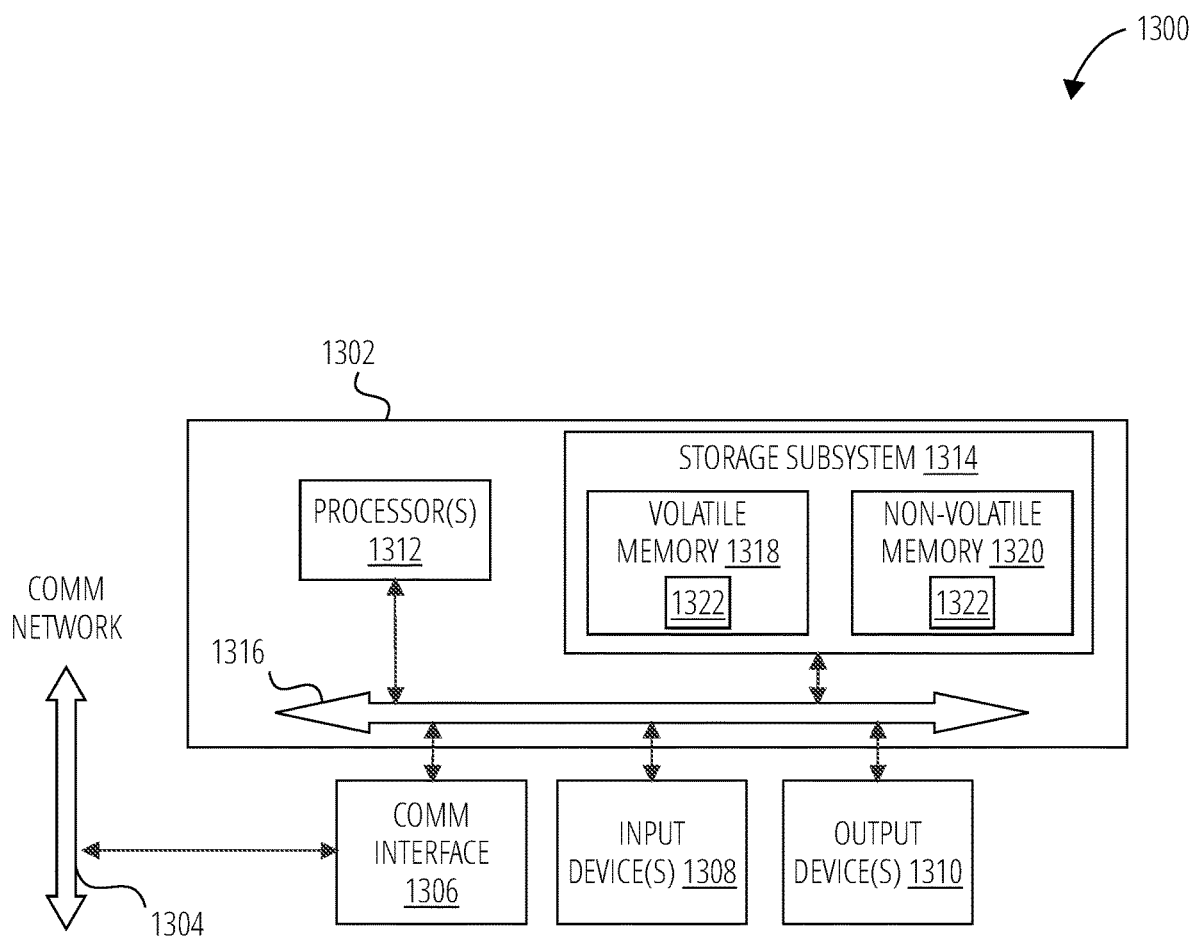
FIG. 13 is an example block diagram of a computing device 1300 that may incorporate certain embodiments.

FIG. 13 is an example block diagram of a computing device 1300 that may incorporate embodiments of the solution. FIG. 13 is merely illustrative of a machine system to carry out aspects of the technical processes described herein and does not limit the scope of the claims. One of ordinary skill in the art would recognize other variations, modifications, and alternatives. In certain embodiments, the computing device 1300 includes a data processing system 1302, a communication network 1304, communication network interface 1306, input device(s) 1308, output device(s) 1310, and the like.

As depicted in FIG. 13, the data processing system 1302 may include one or more processor(s) 1312 and a storage subsystem 1314. "Processor" refers to any circuitry, component, chip, die, package, or module configured to receive, interpret, decode, and execute machine instructions. "Instructions" refers to symbols representing commands for execution by a device using a processor, microprocessor, controller, interpreter, or other programmable logic. Broadly, 'instructions' can mean source code, object code, and executable code. "Instructions" herein is also meant to include commands embodied in programmable read-only memories (EPROM) or hard coded into hardware (e.g., "micro-code") and like implementations wherein the instructions are configured into a machine read-only memory or other hardware component at manufacturing time of a device. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

The processor(s) 1312 communicate with a number of peripheral devices via a bus subsystem 1316. These peripheral devices may include input device(s) 1308, output device(s) 1310, communication network interface 1306, and the storage subsystem 1314. The storage subsystem 1314, In one embodiment, comprises one or more storage devices and/or one or more memory devices.

"Storage device" or "memory device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Non-volatile memory media may comprise one or more non-volatile memory elements, which may include, but are not limited to: chips, packages, planes, memory die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND FLASH memory (e.g., 2D NAND FLASH memory, 3D NAND FLASH memory), NOR FLASH memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

In one embodiment, the storage subsystem 1314 includes a volatile memory 1318 and a non-volatile memory 1320. The volatile memory 1318 and/or the non-volatile memory 1320 may store computer-executable instructions that alone or together form logic 1322 that when applied to, and executed by, the processor(s) 1312 implement embodiments of the processes disclosed herein.

"Volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media.

"Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), read only memory (ROM), double data rate random-access memory (DDR RAM) or other random-access solid-state memory. While the volatile memory media is referred to herein as "memory media," in various embodiments, the volatile memory media may more generally be referred to as volatile memory. In certain embodiments, data stored in volatile memory media is addressable at a byte level which means that the data in the volatile memory media is organized into bytes (8 bits) of data that each have a unique address, such as a logical address. Examples of volatile memory media include but are not limited to dynamic random-access memory (DRAM), static random-access memory (SRAM), double data rate random-access memory (DDR RAM) or other random-access solid-state memory.

While the volatile memory media is referred to herein as "memory media," in various embodiments, the volatile memory media may more generally be referred to as volatile memory.

"Non-volatile memory" refers to shorthand name for non-volatile memory media. In certain embodiments, non-volatile memory media refers to the non-volatile memory media and the logic, controllers, processor(s), state machine(s), and/or other periphery circuits that manage the non-volatile memory media and provide access to the non-volatile memory media.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

The input device(s) 1308 include devices and mechanisms for inputting information to the data processing system 1302. These may include a keyboard, a keypad, a touch screen incorporated into a graphical user interface, audio input devices such as voice recognition systems, microphones, and other types of input devices. In various embodiments, the input device(s) 1308 may be embodied as a computer mouse, a trackball, a track pad, a joystick, wireless remote, drawing tablet, voice command system, eye tracking system, and the like. The input device(s) 1308 typically allow a user to select objects, icons, control areas, text and the like that appear on a graphical user interface via a command such as a click of a button or the like.

The output device(s) 1310 include devices and mechanisms for outputting information from the data processing system 1302. These may include a graphical user interface, speakers, printers, infrared LEDs, and so on, as well understood in the art. In certain embodiments, a graphical user interface is coupled to the bus subsystem 1316 directly by way of a wired connection. In other embodiments, the graphical user interface couples to the data processing system 1302 by way of the communication network interface 1306. For example, the graphical user interface may comprise a command line interface on a separate computing device 1300 such as desktop, server, or mobile device.

The communication network interface 1306 provides an interface to communication networks (e.g., communication network 1304) and devices external to the data processing system 1302. The communication network interface 1306 may serve as an interface for receiving data from and transmitting data to other systems. Embodiments of the communication network interface 1306 may include an Ethernet interface, a modem (telephone, satellite, cable, ISDN), (asynchronous) digital subscriber line (DSL), Fire-Wire, USB, a wireless communication interface such as Bluetooth or WiFi, a near field communication wireless interface, a cellular interface, and the like.

The communication network interface 1306 may be coupled to the communication network 1304 via an antenna, a cable, or the like. In some embodiments, the communication network interface 1306 may be physically integrated on a circuit board of the data processing system 1302, or in some cases may be implemented in software or firmware, such as "soft modems", or the like.

The computing device 1300 may include logic that enables communications over a network using protocols such as HTTP, TCP/IP, RTP/RTSP, IPX, UDP and the like.

The volatile memory 1318 and the non-volatile memory 1320 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1318 and the non-volatile memory 1320 may be configured to store the basic programming and data constructs that provide the functionality of the disclosed processes and other embodiments thereof that fall within the scope of the present invention.

Logic 1322 that implements one or more parts of embodiments of the solution may be stored in the volatile memory 1318 and/or the non-volatile memory 1320. Logic 1322 may be read from the volatile memory 1318 and/or non-volatile memory 1320 and executed by the processor(s) 1312. The volatile memory 1318 and the non-volatile memory 1320 may also provide a repository for storing data used by the logic 1322.

The volatile memory 1318 and the non-volatile memory 1320 may include a number of memories including a main random access memory (RAM) for storage of instructions and data during program execution and a read only memory (ROM) in which read-only non-transitory instructions are stored. The volatile memory 1318 and the non-volatile memory 1320 may include a file storage subsystem providing persistent (non-volatile) storage for program and data files. The volatile memory 1318 and the non-volatile memory 1320 may include removable storage systems, such as removable FLASH memory.

The bus subsystem 1316 provides a mechanism for enabling the various components and subsystems of data processing system 1302 communicate with each other as intended. Although the communication network interface 1306 is depicted schematically as a single bus, some embodiments of the bus subsystem 1316 may utilize multiple distinct busses.

It will be readily apparent to one of ordinary skill in the art that the computing device 1300 may be a device such as a smartphone, a desktop computer, a laptop computer, a rack-mounted computer system, a computer server, or a tablet computer device. As commonly known in the art, the computing device 1300 may be implemented as a collection of multiple networked computing devices. Further, the computing device 1300 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method, comprising:
   converting a set of core timing control conditions of a die controller into a set of production ready core timing control conditions for the die controller;
   generating a set of firmware instructions based on the set of production ready core timing control conditions;
   wherein the set of production ready core timing control conditions comprises a plurality of fixed core timing control conditions;
   modifying the set of firmware instructions such that the set of firmware instructions:
      determines core timing control condition values for the fixed core timing control conditions before implementing storage operations;
      stores the core timing control condition values in one or more global condition registers; and
      modifies references to the fixed core timing control conditions to access core timing control condition values stored in the one or more global condition registers; and
   installing a set of modified firmware instructions on the die controller comprising a microcontroller configured to execute the set of modified firmware instructions.

2. The method of claim 1, further comprising:
   replacing two or more short firmware instructions of the set of firmware instructions with a long firmware instruction;
   modifying a firmware instruction that references a common core timing control condition within a common subroutine, such that the firmware instruction re-uses a value for the common core timing control condition, the value stored in a common subroutine result register; and
   modifying a first firmware instruction of a first subroutine for a storage operation to store a repeated core timing control condition in a local condition register and modifying a second firmware instruction of a second subroutine for the storage operation to reference a value for the repeated core timing control condition from the local condition register.

3. The method of claim 2, further comprising:
   modifying the set of firmware instructions such that each subroutine references the common subroutine result register and a core timing control machine automatically changes an output register associated with the common subroutine result register in response to the core timing control machine transitioning from executing the first subroutine to executing the second subroutine; and replacing repeating firmware instructions in the second subroutine with a call instruction to corresponding firmware instructions in the first subroutine.

4. The method of claim 3, further comprising:

configuring a core timing control condition machine to automatically move a subroutine result to a condition value buffer, in response to the core timing control condition machine initiating execution of a subsequent subroutine; and wherein the core timing control machine is configured to change a control signal value to a set_reset value in response to a corresponding core timing control condition evaluating to true and to retain the control signal value in response to the corresponding core timing control condition evaluating to false.

5. A method, comprising:

converting a set of core timing control conditions of a die controller into a set of production ready core timing control conditions for the die controller;

generating a set of firmware instructions based on the set of production ready core timing control conditions;

replacing two or more short firmware instructions of the set of firmware instructions with a long firmware instruction;

configuring a core timing control condition machine to automatically move a subroutine result to a condition value buffer, in response to the core timing control condition machine initiating execution of a subsequent subroutine;

modifying a firmware instruction that references a common core timing control condition within a common subroutine, such that the firmware instruction re-uses a value for the common core timing control condition, the value stored in a common subroutine result register;

modifying a first firmware instruction of a first subroutine for a storage operation to store a repeated core timing control condition in a local condition register and modifying a second firmware instruction of a second subroutine for the storage operation to reference a value for the repeated core timing control condition from the local condition register;

wherein the set of production ready core timing control conditions comprises a plurality of fixed core timing control conditions;

modifying the set of firmware instructions such that the set of firmware instructions:
  determines core timing control condition values for the plurality of fixed core timing control conditions before implementing storage operations;
  stores the core timing control condition values in one or more global condition registers; and
  modifies references to the plurality of fixed core timing control conditions to access the core timing control condition values stored in the one or more global condition registers;

modifying the set of firmware instructions such that each subroutine references the common subroutine result register and the core timing control machine automatically changes an output register associated with the common subroutine result register in response to the core timing control machine transitioning from executing the first subroutine to executing the second subroutine;

replacing repeating firmware instructions in the second subroutine with a call instruction to corresponding firmware instructions in the first subroutine; and wherein a core timing control machine is configured to change a control signal value to a set_reset value in response to a corresponding core timing control condition evaluating to true and to retain the control signal value in response to the corresponding core timing control condition evaluating to false.

6. The method of claim 5, wherein the core timing control condition machine is configured to execute short firmware instructions and long firmware instructions.

7. The method of claim 5, wherein converting the set of core timing control conditions into the set of production ready core timing control conditions comprises removing proprietary core timing control conditions from the set of core timing control conditions.

8. The method of claim 5, wherein the set of firmware instructions implements one or more storage operations wherein each storage operation includes a sequence of two or more subroutines correlated to a timing sequence for the storage operation, the timing sequence comprising an ordered set of time segments;
  wherein the core timing control machine automatically changes an output register associated with the common subroutine result register in response to the core timing control machine transitioning from executing a first subroutine within a first time segment to executing the second subroutine within a second time segment.

9. The method of claim 5, wherein the set_reset value is determined by a set_reset machine configured to determine the set_reset value based on the corresponding core timing control condition.

10. The method of claim 5, wherein converting the set of core timing control conditions into the set of production ready core timing control conditions comprises evaluating the set of core timing control conditions with one or more proprietary core timing control conditions set to zero.

11. The method of claim 10, wherein the one or more proprietary core timing control conditions comprise one of a test mode core timing control condition and a built in self test (BIST) core timing control condition.

12. An apparatus, comprising:
  non-volatile memory array comprising a plurality of control signals configured to perform storage operations based on settings for the plurality of control signals;
  an instruction buffer configured to store a set of firmware instructions such that one or more pairs of firmware instructions of the set of firmware instructions each share a common address within the instruction buffer;
  a first core timing control machine configured to execute one firmware instruction of a first pair of firmware instructions to determine control signal values for the plurality of control signals, the first core timing control machine further configured to set the determined control signal values in a control signal setting buffer;
  a second core timing control machine configured to execute a second firmware instruction of the pair of firmware instructions in parallel to determine control signal values for the plurality of control signals, the second core timing control machine further configured to set the determined control signal values in the control signal setting buffer; and
  a clock configured to operate the first core timing control machine and the second core timing control machine concurrently, each of the first core timing control machine and the second core timing control machine alternately executing time segments of a storage operation.

13. The apparatus of claim 12, wherein the first core timing control machine and the second core timing control machine each comprise:
   a core timing control condition machine configured to execute a subroutine of the set of firmware instructions to determine a core timing control condition value represented by the subroutine;
   a set_reset machine configured to determine a set_reset value to assign to a control signal in response to the core timing control condition value being true; and
   a core machine configured to determine the settings for the plurality of control signals during a clock cycle, based on the core timing control condition value provided by the core timing control condition machine and the set_reset value from the set_reset machine and assign the settings to the plurality of control signals.

14. The apparatus of claim 13, wherein the core machine comprises:
   a condition value buffer organized such that a first core timing control condition value placed in the condition value buffer is the first core timing control condition value retrieved;
   a fetch module configured to retrieve the core timing control condition value from the condition value buffer and the set_reset value provided by the set_reset machine;
   a decoder configured to associate the set_reset value with the plurality of control signals and to determine whether a control signal changes from a prior value to a new set_reset value or remains unchanged; and
   an execution module configured to modify the control signal setting buffer to include control settings for the plurality of control signals for use in a subsequent clock cycle.

15. The apparatus of claim 14, wherein the decoder is further configured to organize the plurality of control signals into groups and associate the set_reset value such that four or more groups of control signals are set to the new set_reset value or remain unchanged in a single clock cycle.

16. The apparatus of claim 12, wherein the first core timing control machine and the second core timing control machine each comprise:
   a first core timing control condition machine configured to execute a first subroutine of the set of firmware instructions to determine a core timing control condition value for a core timing control condition represented by the subroutine and to store the core timing control condition value in a condition value buffer;
   a second core timing control condition machine configured to execute a second subroutine of the set of firmware instructions to determine a second core timing control condition value for a second core timing control condition represented by the second subroutine and to store the second core timing control condition value in the condition value buffer, the second core timing control condition machine configured to execute concurrent with the first core timing control condition machine;
   a set_reset machine configured to determine a set_reset value to assign to a control signal in response to the core timing control condition read from the condition value buffer; and
   a core machine configured to determine the settings for the plurality of control signals within a clock cycle, based on the first core timing control condition value and the second core timing control condition value and the set_reset value from the set_reset machine and assign the settings to the plurality of control signals.

17. The apparatus of claim 16, wherein the first subroutine comprises fewer firmware instructions than the second subroutine and the first subroutine is configured to execute firmware instructions of the second subroutine.

18. The apparatus of claim 16, wherein the first subroutine comprises N firmware instructions and the second subroutine comprises M firmware instructions, wherein M>N, and the first subroutine is configured to execute (M–N)/2 firmware instructions of the second subroutine, subsequent to the first subroutine executing the N firmware instructions.

19. The apparatus of claim 12, wherein the pair of firmware instructions in the instruction buffer comprises a forty-bit entry and short firmware instructions of the pair of firmware instructions occupy twenty-bits of memory, the pair of firmware instructions sharing the common address within the instruction buffer.

20. The apparatus of claim 12, wherein the clock is configured to manage a clock cycle for a particular storage operation that progresses through a series of time segments of a timing sequence defined for the particular storage operation.

* * * * *